United States Patent
Nielsen et al.

(10) Patent No.: US 12,490,199 B2
(45) Date of Patent: Dec. 2, 2025

(54) CARRIER MANAGEMENT IN A WIRELESS COMMUNICATION NETWORK

(71) Applicant: NOKIA TECHNOLOGIES OY, Espoo (FI)

(72) Inventors: Sari Nielsen, Espoo (FI); Petri J. Vasenkari, Turku (FI); Samantha Caporal Del Barrio, Aalborg (DK); Nuno K. Pratas, Gistrup (DK); Tero Henttonen, Espoo (FI); Benny Vejlgaard, Gistrup (DK); Simon Svendsen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 429 days.

(21) Appl. No.: 17/925,213

(22) PCT Filed: May 13, 2021

(86) PCT No.: PCT/IB2021/054116
§ 371 (c)(1),
(2) Date: Nov. 14, 2022

(87) PCT Pub. No.: WO2021/229503
PCT Pub. Date: Nov. 18, 2021

(65) Prior Publication Data
US 2023/0232334 A1    Jul. 20, 2023

(30) Foreign Application Priority Data

May 13, 2020    (EP) .................................... 20174385

(51) Int. Cl.
*H04W 76/10*    (2018.01)
*H04W 52/14*    (2009.01)
*H04W 52/36*    (2009.01)

(52) U.S. Cl.
CPC ....... *H04W 52/146* (2013.01); *H04W 52/367* (2013.01)

(58) Field of Classification Search
CPC ...... H04W 76/19; H04W 36/08; H04W 76/15
See application file for complete search history.

(56) References Cited

U.S. PATENT DOCUMENTS

| | | |
|---|---|---|
| 9,585,099 B1 | 2/2017 | Manchanda et al. |
| 2019/0110254 A1 | 4/2019 | Yerramalli et al. |

(Continued)

FOREIGN PATENT DOCUMENTS

| | | |
|---|---|---|
| WO | 2020/259852 A1 | 12/2020 |
| WO | 2021/008710 A1 | 1/2021 |
| WO | 2021/052716 A1 | 3/2021 |

OTHER PUBLICATIONS

Notice of Allowance received for corresponding European Patent Application No. 20174385.3, dated Apr. 23, 2024, 8 pages.

(Continued)

*Primary Examiner* — Tu X Nguyen
(74) *Attorney, Agent, or Firm* — Barta Jones, PLLC

(57) ABSTRACT

Certain examples of the present invention relate to carrier management in a wireless communication network. Certain examples provide a User Equipment, UE, comprising: means for receiving, following a maximum permissible exposure, MPE, event occurring during operation over a first carrier such that the UE is no longer operating over the first carrier, a first signal, over a second carrier, for configuring the UE to determine a status of the MPE event associated with the previously used first carrier; means for determining, responsive to receipt of the first signal, a current status of the MPE event associated with the previously used first carrier; and means for transmitting, responsive to receipt of the first signal, a second signal over the second carrier, wherein the (Continued)

second signal comprises an indication of the current status of the MPE event associated with the previously used first carrier.

20 Claims, 5 Drawing Sheets

(56) References Cited

U.S. PATENT DOCUMENTS

| | | |
|---|---|---|
| 2019/0141783 A1 | 5/2019 | Malik et al. |
| 2019/0200365 A1 | 6/2019 | Sampath et al. |
| 2019/0261289 A1 | 8/2019 | Raghavan et al. |
| 2021/0282211 A1* | 9/2021 | Pezeshki ............... H04W 76/19 |
| 2023/0040162 A1* | 2/2023 | Yuan ................... H04W 52/367 |

OTHER PUBLICATIONS

Wu et al., "Safe for Generations to Come: Considerations of Safety for Millimeter Waves in Wireless Communications", IEEE Microwave Magazine, vol. 16, No. 2, Mar. 2015, pp. 65-84.

Alekseev et al., "Millimeter wave power density in aqueous biological samples", Bioelectromagnetics, vol. 22, No. 4, 2001, pp. 288-291.

"Federal Communications Commission", code of federal regulations, Retrieved on Apr. 2, 2024, Webpage available at : https://www.ecfr.gov/current/title-47/chapter-I/subchapter-A/part-2/subpart-J/subject-group-ECFR52efa600149ef42/section-2.1093.

Wu et al., "The Human Body and Millimeter-Wave Wireless Communication Systems: Interactions and Implications", IEEE International Conference on Communications (ICC), Jun. 8-12, 2015, pp. 2423-2429.

"3rd Generation Partnership Project; Technical Specification Group Radio Access Network; NR; User Equipment (UE) radio transmission and reception; Part 2: Range 2 Standalone (Release 16)", 3GPP TS 38.101-2, V16.2.0, Dec. 2019, pp. 1-157.

"Required P-MPR/UL dutycycle restriction for MPE regulations at FR2", 3GPP TSG-RAN WG4 Meeting #90, R4-1900252, Agenda: 6.7.4.2, LG Electronics, Feb. 25-Mar. 1, 2019, 5 pages.

"Discussion on FR2 UE MPE remaining issues", 3GPP TSG-RAN WG4 Meeting #90, R4-1900253, Agenda: 6.7.8, OPPO, Feb. 25-Mar. 1, 2019, 4 pages.

"FR2 UE RF exposure compliance and its system implications", 3GPP TSG-RAN WG4 Meeting #89, R4-1814862, Agenda: 7.6.6.1.2, Nokia, Nov. 12-16, 2018, 4 pages.

"UE FR2 MPE mitigation", 3GPP TSG RAN WG1 Meeting #99, R1-1913109, Agenda: 5.2, Nokia, Nov. 18-22, 2019, 4 pages.

Extended European Search Report received for corresponding European Patent Application No. 20174385.3, dated Oct. 13, 2020, 9 pages.

Office action received for corresponding European Patent Application No. 20174385.3, dated Jun. 27, 2022, 6 pages.

Office action received for corresponding Indian Patent Application No. 202217070091, dated Feb. 13, 2024, 5 pages.

International Search Report and Written Opinion dated Jun. 22, 2021 corresponding to International Patent Application No. PCT/IB2021/054116.

Nokia et al., "UE FR2 MPE enhancements and solutions," 3GPP Draft R4-1914274, 3GPP TSG RAN WG4 Meeting #93, Reno, USA, Nov. 18-22, 2019, Nov. 8, 2019, XP051818699.

\* cited by examiner

CARRIER MANAGEMENT IN A WIRELESS COMMUNICATION NETWORK

TECHNOLOGICAL FIELD

Examples of the present disclosure relate to carrier management in a wireless communication network. Some examples relate to re-establishing operation of a carrier that has been subject to a Maximum Permissible Exposure (MPE) event.

BACKGROUND

In 5th Generation (5G) New Radio (NR), a UE can communicate with a Radio Access Network (RAN) node via one or more radio links operating over one or more carriers in the millimetre-wave (mmW) part of the electromagnetic spectrum, namely utilising frequencies between 24 GHz and 52 GHz-known as Frequency Range 2 (FR2). The use of such high frequencies is subject to MPE limits stipulated by regulatory bodies such as the Federal Communications Commission (FCC). User Equipment (UE) is capable of transmitting electromagnetic radiation at frequencies and power levels that could, if not restricted, exceed MPE limits.

In order to ensure compliance with MPE limits for UE uplink (UL) signals transmitted over a 5G NR FR2 carrier, the UE may restrict its uplink transmission power. However, this can cause a reduction of the UL transmission power of the UE to a level that is insufficient to maintain an adequate connection link over the 5G NR FR2 carrier. Due to this, when a UE is operating over a 5G NR FR2 carrier, upon detection of an MPE event (such as a detection of a user's body part proximal to the UE's antenna and in a propagation pathway from the UE's antenna to a RAN node thereby necessitating a restriction of the uplink transmission power to ensure compliance with MPE limits), the RAN node may transition the UE from operating over the 5G NR FR2 carrier to operating over a different carrier e.g. a Long Term Evolution (LTE) carrier or a 5G Frequency Range 1 (FR1) carrier that uses sub 6 GHz frequencies (i.e. ranging from 400 MHz to 6 GHZ) for which MPE limits do not apply.

In some circumstances, it may be desirable to seek to restore the UE to operating over the 5G NR FR2 carrier.

Certain examples of the disclosure seek to provide an improved process for restoring UE operation over a previously used carrier that had been subject to an MPE event. Certain examples of the disclosure seek to avoid/reduce attempts to restore a UE to operation over the previously used carrier whilst the MPE event is still active for the carrier. Certain examples seek to reduce signalling overhead and wasted resources in attempting to re-establish UE operation over the previously used carrier, as well as hasten the re-establishment process.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the invention is set out by the independent claims. Any examples/embodiments and features described in this specification that do not fall under the scope of the independent claims are to be interpreted as examples useful for understanding various embodiments of the invention.

According to at least some examples of the disclosure there is provided a User Equipment, UE, comprising:
 means for receiving, following a maximum permissible exposure, MPE, event occurring during operation over a first carrier such that the UE is no longer operating over the first carrier, a first signal, over a second carrier, for configuring the UE to determine a status of the MPE event associated with the previously used first carrier;
 means for determining, responsive to receipt of the first signal, a current status of the MPE event associated with the previously used first carrier; and
 means for transmitting, responsive to receipt of the first signal, a second signal over the second carrier, wherein the second signal comprises an indication of the current status of the MPE event associated with the previously used first carrier.

According to at least some examples of the disclosure there is provided a method comprising:
 receiving, following a maximum permissible exposure, MPE, event occurring during operation of a User Equipment, UE, over a first carrier such that the UE is no longer operating over the first carrier, a first signal, over a second carrier, for configuring the UE to determine a status of the MPE event associated with the previously used first carrier;
 determining, responsive to receipt of the first signal, a current status of the MPE event associated with the previously used first carrier; and
 transmitting, responsive to receipt of the first signal, a second signal over the second carrier, wherein the second signal comprises an indication of the current status of the MPE event associated with the previously used first carrier.

According to at least some examples of the disclosure there is provided computer program instructions for causing a User Equipment, UE, to perform:
 receiving, following a maximum permissible exposure, MPE, event occurring during operation over a first carrier such that the UE is no longer operating over the first carrier, a first signal, over a second carrier, for configuring the UE to determine a status of the MPE event associated with the previously used first carrier;
 determining, responsive to receipt of the first signal, a current status of the MPE event associated with the previously used first carrier; and
 transmitting, responsive to receipt of the first signal, a second signal over the second carrier, wherein the second signal comprises an indication of the current status of the MPE event associated with the previously used first carrier.

According to at least some examples of the disclosure there is provided a User Equipment, UE, comprising:
 at least one processor; and
 at least one memory including computer program instructions;
 the at least one memory and the computer program instructions configured to, with the at least one processor, cause the UE at least to perform:
 program instructions for causing:
  receiving, following a maximum permissible exposure, MPE, event occurring during operation over a first carrier such that the UE is no longer operating over the first carrier, a first signal, over a second carrier, for configuring the UE to determine a status of the MPE event associated with the previously used first carrier;

determining, responsive to receipt of the first signal, a current status of the MPE event associated with the previously used first carrier; and transmitting, responsive to receipt of the first signal, a second signal over the second carrier, wherein the second signal comprises an indication of the current status of the MPE event associated with the previously used first carrier.

According to at least some examples of the disclosure there is provided a non-transitory computer readable medium encoded with instructions that, when performed by at least one processor, causes at least the following to be performed:

receiving, following a maximum permissible exposure, MPE, event occurring during operation of a User Equipment, UE, over a first carrier such that the UE is no longer operating over the first carrier, a first signal, over a second carrier, for configuring the UE to determine a status of the MPE event associated with the previously used first carrier;

determining, responsive to receipt of the first signal, a current status of the MPE event associated with the previously used first carrier; and transmitting, responsive to receipt of the first signal, a second signal over the second carrier, wherein the second signal comprises an indication of the current status of the MPE event associated with the previously used first carrier.

According to at least some examples of the disclosure there is provided a Radio Access Network, RAN, node comprising:

means for transmitting, following a maximum permissible exposure, MPE, event occurring during operation of a User Equipment, UE, over a first carrier such that the UE is no longer operating over the first carrier, a first signal, over a second carrier, for configuring the UE to determine a status of the MPE event associated with the previously used first carrier;

means for receiving, responsive to transmission of the first signal, a second signal over the second carrier, wherein the second signal comprises an indication of a current status of the MPE event associated with the previously used first carrier.

According to at least some examples of the disclosure there is provided a method comprising:

transmitting, following a maximum permissible exposure, MPE, event occurring during operation of a User Equipment, UE, over a first carrier such that the UE is no longer operating over the first carrier, a first signal, over a second carrier, for configuring the UE to determine a status of the MPE event associated with the previously used first carrier;

receiving, responsive to transmission of the first signal, a second signal over the second carrier, wherein the second signal comprises an indication of a current status of the MPE event associated with the previously used first carrier.

According to at least some examples of the disclosure there is provided computer program instructions for causing a Radio Access Network, RAN, node to perform:

transmitting, following a maximum permissible exposure, MPE, event occurring during operation of a User Equipment, UE, over a first carrier such that the UE is no longer operating over the first carrier, a first signal, over a second carrier, for configuring the UE to determine a status of the MPE event associated with the previously used first carrier;

receiving, responsive to transmission of the first signal, a second signal over the second carrier, wherein the second signal comprises an indication of a current status of the MPE event associated with the previously used first carrier.

According to at least some examples of the disclosure there is provided a Radio Access Network, RAN, node comprising:

at least one processor; and at least one memory including computer program instructions;

the at least one memory and the computer program instructions configured to, with the at least one processor, cause the RAN node at least to perform:

transmitting, following a maximum permissible exposure, MPE, event occurring during operation of a User Equipment, UE, over a first carrier such that the UE is no longer operating over the first carrier, a first signal, over a second carrier, for configuring the UE to determine a status of the MPE event associated with the previously used first carrier;

receiving, responsive to transmission of the first signal, a second signal over the second carrier, wherein the second signal comprises an indication of a current status of the MPE event associated with the previously used first carrier.

According to at least some examples of the disclosure there is provided a non-transitory computer readable medium encoded with instructions that, when performed by at least one processor, causes at least the following to be performed:

transmitting, following a maximum permissible exposure, MPE, event occurring during operation of a User Equipment, UE, over a first carrier such that the UE is no longer operating over the first carrier, a first signal, over a second carrier, for configuring the UE to determine a status of the MPE event associated with the previously used first carrier;

receiving, responsive to transmission of the first signal, a second signal over the second carrier, wherein the second signal comprises an indication of a current status of the MPE event associated with the previously used first carrier.

According to at least some examples of the disclosure there is provided a User Equipment, UE, comprising:

means for detecting an occurrence of a maximum permissible exposure, MPE, event occurring during operation over a first carrier;

means for determining a loss of connection over the first carrier;

means for transmitting, responsive to the detection of the MPE event and the determination of the loss of connection over the first carrier, one or more signals for requesting connection over a second carrier, wherein the one or more signals comprises an indication of the occurrence of the MPE event associated with the previously used first carrier.

According to at least some examples of the disclosure there is provided a method comprising:

detecting, an occurrence of a maximum permissible exposure, MPE, event occurring during operation over a first carrier;

determining a loss of connection over the first carrier;

transmitting, responsive to the detection of the MPE event and the determination of the loss of connection over the first carrier, one or more signals for requesting connection over a second carrier, wherein the one or more signals comprises an indication of the occurrence of the MPE event associated with the previously used first carrier.

According to various, but not necessarily all, examples of the disclosure there is provided computer program instructions for causing the above method to be performed.

According to at least some examples of the disclosure there is provided a Radio Access Network, RAN, node comprising:

means for receiving, following a maximum permissible exposure, MPE, event occurring during operation of a User Equipment, UE, over a first carrier such that the UE is no longer operating over the first carrier, a signal from the UE for requesting connection over a second carrier, wherein the signal comprises an indication of an occurrence of the MPE event associated with the previously used first carrier.

According to at least some examples of the disclosure there is provided a method comprising:

receiving, following a maximum permissible exposure, MPE, event occurring during operation of a User Equipment, UE, over a first carrier such that the UE is no longer operating over the first carrier, a signal from the UE for requesting connection over a second carrier, wherein the signal comprises an indication of an occurrence of the MPE event associated with the previously used first carrier.

According to various, but not necessarily all, examples of the disclosure there is provided computer program instructions for causing the above method to be performed.

BRIEF DESCRIPTION OF THE DRAWINGS

For a better understanding of various examples of the present disclosure that are useful for understanding the detailed description and certain examples of the present disclosure, reference will now be made by way of example only to the accompanying drawings in which.

Figure 1:
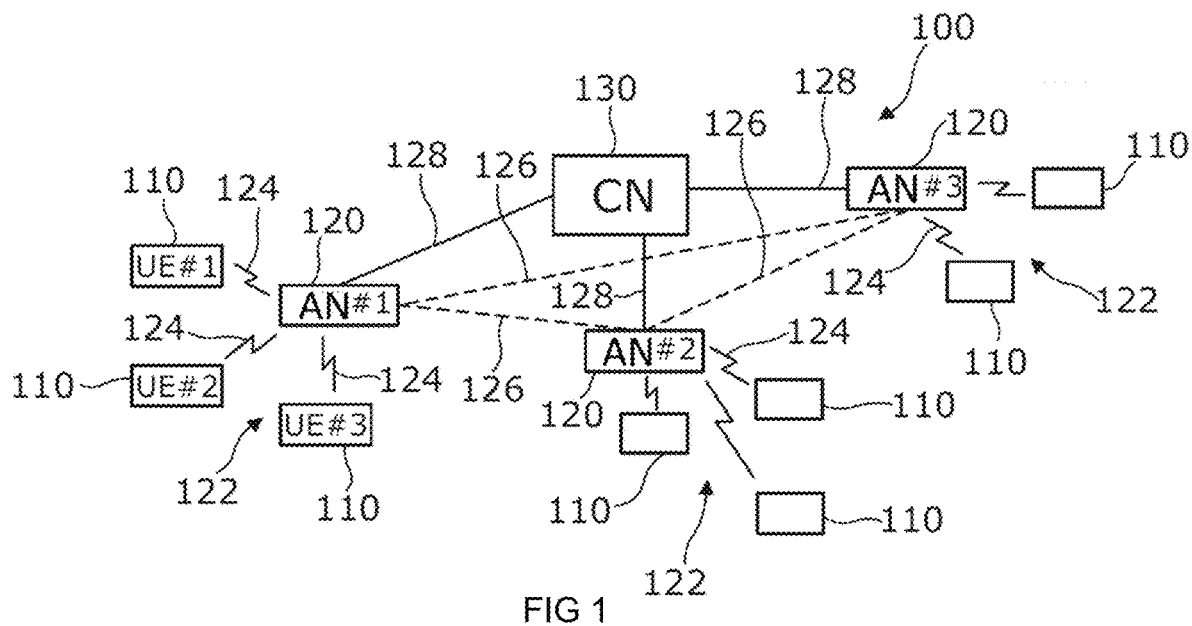
FIG. 1 schematically illustrates an example of a wireless communication network suitable for use with examples of the present disclosure.

The figures are not necessarily to scale. Certain features and views of the figures may be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

LIST OF ABBREVIATIONS

3GPP Third Generation Partnership Project
5G 5th Generation
CA Carrier Aggregation
DC-CA Dual Connectivity Carrier Aggregation
EIRP Effective Isotropic Radiated Power
EN-DC E-UTRA-New Radio Dual Connectivity
E-UTRA Evolved UMTS Radio Access
Frequency Range 1 (400 MHz-6 GHZ)
FR2 Frequency Range 2 (24 GHz-52 GHZ)
gNB gNodeB
ICNIRP International Commission on non-ionizing Radiation Protection
IE Information Element
LTE Long Term Evolution
MAC CE Medium Access Control Control Element
mmW millimetre-wave
MN Master Node
MR-DC Multi Radio Access Technology-Dual Connection
MPE Maximum Permissible Exposure
NG Next Generation
NR New Radio/Next Radio
NR-DC NR-NR Dual Connectivity
PBO Power Back Off
P-MPR Power Management Maximum Power Reduction
RAN Radio Access Network node
RAT Radio Access Technology
RLF Radio Link Failure
RRC Radio Resource Control
RSRP Reference Signal Received Power
RSRQ Reference Signal Received Quality
SAR Specific Absorption Rate
SCG Secondary Cell Group
S-RLF Secondary RLF
SRB Signalling Radio Bearer
SN Secondary Node
SS Synchronization Signal
UE User Equipment
UL Uplink
UMTS Universal Mobile Telecommunications System
URLLC Ultra Reliable Low Latency Communications

DETAILED DESCRIPTION

FIG. 1 schematically illustrates an example of a network 100 comprising a plurality of network nodes including terminal nodes 110 (also referred to as User Equipment), access nodes 120 (also referred to as RAN nodes, transmission reception points, base stations), and core network 130.

The terminal nodes 110 and access nodes 120 communicate with each other. The core network 130 communicates with the access nodes 120. One or more core nodes of the core network 130 may, in some but not necessarily all examples, communicate with each other. The one or more access nodes 120 may, in some but not necessarily all examples, communicate with each other.

The network 100 may be a cellular network comprising a plurality of cells 122 each served by an access node 120. The interfaces between the terminal nodes 110 and the access nodes 120 are radio interfaces 124. The access nodes 120 are cellular radio transceivers. The terminal nodes 110 are cellular radio transceivers.

In the particular example illustrated, the network 100 is a Next Generation (or New Radio, NR) network. New Radio is the 3GPP name for 5G technology. The terminal nodes 110 are user equipment (UE).

In the present example, the access nodes 120 can be gNodeBs (gNBs), or Universal Terrestrial Radio Access network (UTRAN) NodeB (NBs), or Evolved Universal Terrestrial Radio Access network (E-UTRAN) NodeB (eNBs). Depending on the exact deployment scenario, the access nodes 120 could be, ng-eNB, or en-gNB equipment The access nodes 120 are interconnected with each other by means of X2 or Xn interfaces 126. The access nodes 120 are also connected by means of NG or S1 interfaces 128 to the core network 130. The cellular network 100 could be configured to operate in licensed or unlicensed frequency bands.

The access nodes 120 can be deployed in a NR standalone operation/scenario. The access nodes 120 can be deployed in a non-standalone operation/scenario. The access nodes can be deployed in a Carrier Aggregation operation/scenario. The access nodes 120 can be deployed in a dual connectivity operation/scenario, i.e. Multi Radio Access Technology-Dual Connection (MR-DC), not least for example such as:

Evolved Universal Terrestrial Radio Access—New Radio Dual Connectivity (EUTRA-NR-DC, also referred to as EN-DC), New Radio—Evolved Universal Terrestrial Radio Access Dual Connectivity (NR-EUTRA-DC, also referred to as NE-DC), Next Generation Radio Access Network Evolved Universal Terrestrial Radio Access—New Radio Dual Connectivity (NG-RAN E-UTRA-NR Dual Connectivity, also referred to as NGEN-DC), or in New Radio Dual Connectivity (also referred to as NR-DC).

In such non-standalone/dual connectivity deployments, the access nodes 120 may be interconnected to each other by means of X2 or Xn interfaces, and connected to an Evolved Packet Core (EPC) by means of an S1 interface or to a 5G Core (5GC) by means of a NG interface.

The access nodes 120 are network elements in the network responsible for radio transmission and reception in one or more cells 122 to or from the terminal nodes 110. Such access nodes may also be referred to as a transmission reception points (TRP's) or base stations. The access nodes 120 are the network termination of a radio link. An access node can be implemented as a single network equipment, or distributed over two or more RAN nodes, such as a central unit (CU), a distributed unit (DU), a remote radio head-end (RRH), using different functional-split architectures and different interfaces.

The terminal nodes 110 are devices that terminate the user side of the radio link. They are devices allowing access to network services. The terminal nodes 110 may be mobile terminals. The terminal nodes 110 may be user equipment or mobile stations. The term 'User Equipment' may be used to designate mobile equipment comprising a smart card for authentication/encryption etc such as a subscriber identity module (SIM). In other examples, the term 'user equipment' is used to designate mobile equipment comprising circuitry embedded as part of the user equipment for authentication/encryption such as software SIM.

In the following description, an access node 120 will be referred to as a RAN node 120, and a terminal node 110 will be referred to as a UE 110.

Each of the RAN node 120 and UE's 110 may comprise one or more antennas, antenna patches or antenna panels, each comprising an array of antenna elements. A controller controls phase shifts and amplitudes of the radio frequency electrical signals applied to the antenna elements to generate a beamformed directional electromagnetic wave transmitted signal having a controlled direction/beam steering direction and a beam pattern (radiation pattern), thereby forming a transmission beam (e.g. a RAN node transmission beam for use with downlink transmission; and a UE transmission beam for use with uplink transmission). The transmission beam relates to a spatially directed transmission with power focused in an aiming direction or beam steering/pointing angle, such an angle corresponding to a direction of a main lobe of the transmitted radiation pattern.

The controller may process the phase shifts and amplitudes of radio frequency electrical signals received from the antenna elements (such radio frequency electrical signals corresponding to transduced electrical signals from received electromagnetic wave signals) to achieve a preferred beamforming direction for reception, thereby forming a reception beam (e.g. a UE reception beam for use with downlink reception, and a RAN node reception beam for use with uplink reception). The reception beam relates to spatially directed reception wherein reception sensitivity is maximal at an aiming direction or pointing angle.

Beamforming, to form directional links for radio communication, may be used to compensate for high path-losses due to poor radio frequency (RF) propagation, which may affect the mmW/high frequency transmissions that can be used with 5G NR networks during operation over a 5G NR FR2 carrier-namely at frequencies in the region of 24-52 GHz (as compared to 5G NR 's Frequency Range 1 (FR1)'s sub 6 GHz range). In addition to beam forming, high gain antennas are used to maintain the link budget required to maintain a connectivity link between the UE and RAN node.

Transmission of signals from a UE to the RAN node 120 is uplink (UL) transmission via an uplink (UL) beam. A UL beam may be considered to comprise a beam pair, namely a transmission beam (from the UE) and reception beam (of the RAN node). Such a directional transmitter-side beam and a corresponding aligned directional receiver side beam jointly provide a UL beam pair for UL transmission/reception and connectivity over a given carrier, such as a 5G FR2 carrier (i.e. an optimal radio communication link/channel within the constraints of power, bandwidth and signal quality over a given carrier). It is to be appreciated that the transmission and reception beams are not necessarily physically aligned towards each other/in direct line of sight, not least for example in situations where there is a rich-scattering environment.

In a 5G NR network, an UL beam/beam pair may be considered to relate to a beamformed directional link from a UE to a RAN node, such a directional link having a directional transmission beam for UL transmission (UE UL Tx beam), and a corresponding directional reception beam for the UL transmission (RAN node UL Rx beam), such a transmission beam and reception beam for UL transmission thereby defining a UL beam pair, also referred to simply as UL beam.

Figure 2:
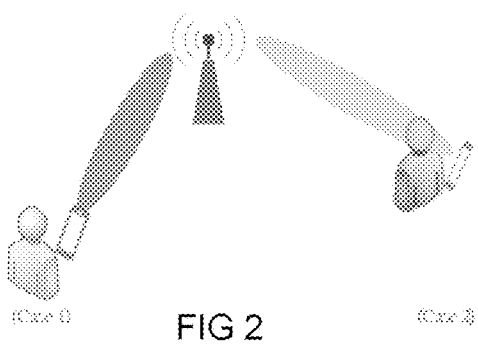
FIG. 2 schematically illustrates an example of user un-obstructed and user obstructed UL beams of UE's.

FIG. 2 schematically illustrates a portion of a wireless communication network comprising a RAN node and two Power Class 3 (PC3) UE's operating over a 5G NR FR2 carrier, i.e. operating in the mmW part of the electromagnetic spectrum.

The millimetre-wave (mmW) spectrum offers the possibility of using large portions of contiguous bandwidth to address high-throughput applications. The 5G NR frequency spectrum may extend well above the frequency spectrum utilised by LTE/4G, which ranges from 400 MHz to 6 GHz. In mmWave 5G NR, FR2 comprises the frequencies between 24 GHz and 52 GHz; and extending the NR operation into the 52-114 GHZ range (Frequency Range 3) is currently being discussed.

However, operating at such high frequencies with high gain antennas has raised concerns for the health of users. Therefore, there is a standard on mmW regime that specifies and regulates the maximum transmission power for UE. Since frequencies below 100 GHz are non-ionizing, the concern for health is limited to thermal heating of body tissue while absorbing electromagnetic mmW energy. mmW frequencies yield penetration depths below 1 mm, therefore possible thermal damage is limited to the surface of the skin and the eyes. Most of the energy is absorbed within the first 0.4 mm of the human skin at 42 GHz.

Governmental exposure guidelines are in place to prevent health issues due to thermal effects. Below 6 GHz (e.g. LTE), Specific Absorption Rate (SAR) has been used to determine the exposure threshold. SAR measures the energy absorbed by the human body when exposed to electromagnetic fields. In the US, the FCC stipulate a SAR limitation of 1.6 W/kg averaged over 1 g of tissue. Whereas, in Europe, it is 2 W/kg averaged over 10 g of tissue. The 1 g averaging provides a finer resolution for the study of energy absorption in the human body.

In the mmW regime, where the penetration depth is below 1 mm, even 1 g of tissue is rather a large volume. Since it can be difficult to define a meaningful volume for SAR evaluation, it has been commonly accepted to use Power Density (PD) and not SAR to set the restrictions on exposure at mmW frequencies. It is thus a planar energy distribution as opposed to a volumetric one. The MPE is the regulation on PD for the mmWave regime. Federal Communications Commission (FCC) and International Commission on Non-Ionizing Radiation Protection (ICNIRP), as well as multiple other regulatory agencies impose MPE constraints on transmitters at various carrier frequencies (not least such as mmWave transmissions). MPE constraints are typically specified in terms of short-term temporal averaging of radiated power, medium-term temporal averaging of radiated power, local-spatial averaging of radiated power, and/or medium-spatial averaging of radiated power. The imposing of the MPE constraints can prevent hazardous operating conditions, ensure users' optimal health, and/or reduce electromagnetic pollution or noise/interference from mmWave transmissions.

The FCC and ICNIRP set the threshold for MPE at 10 W/m² (1 mW/cm²) for the general public, between 6 or 10 GHz respectively and 100 GHz. The energy absorbed by the human body increases as a function of decreasing distance to the UE. Therefore, to comply with the MPE limit, the UE might have to reduce its output power if the user gets in close vicinity of the antenna. A UE may determine and conform to MPE constraints autonomously or locally at the UE. For example, the UE may detect a distance from an antenna or an antenna array of the UE to a user's body part (e.g., a hand, face, ankle, etc.), determine an MPE constraint based on the detected distance, and transmit using an MPE compliant restricted UL power based on the detected distance.

FIG. 2 illustrates an example of user un-obstructed UE UL beam (case 1) and a user obstructed UE UL beam.

In case 1, there is an unobstructed Line of Sight (LOS) propagation path of the UE UL beam from the UE to the RAN node. In case 2, a part of a human body obstructs the path of the UE's UL beam from the UE to the RAN node.

In case 1, the Effective Isotropic Radiated Power (EIRP) of the PC3 UE peaks at +34 dBm, while in case 2, the UE has to reduce its output power to comply with the MPE regulations, as the user is exposed to and in close proximity to the radiated beam.

Figure 3:
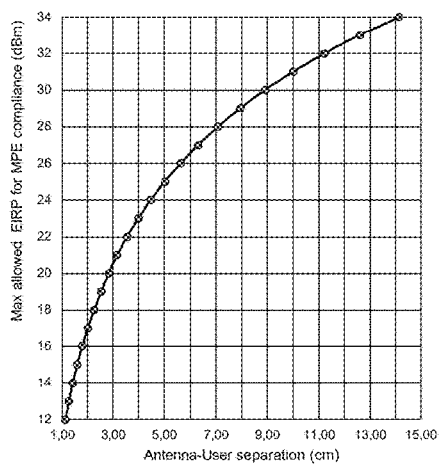
FIG. 3 illustrates an example of maximum allowed Effective Isotropic Radiated Power (EIRP) based on user distance to a UE and the effect of the same on the UE's range.
Figure 3:
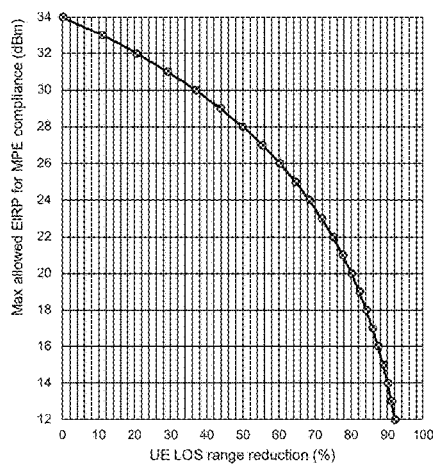

FIG. 3 illustrates a graph of the maximum allowed Effective Isotropic Radiated Power (EIRP) vs. user distance to a UE, as well as a graph of the maximum allowed Effective Isotropic Radiated Power (EIRP) vs. the UE's transmission range.

The graph on the left of FIG. 3 illustrates the relationship between the maximum allowed EIRP (i.e. the maximum EIRP allowed to comply with MPE limits) and the separation between the UE and a user. In this example, for a PC3 UE, when the user is nearly touching the antenna (1 cm away), there is a reduction in maximum allowed peak EIRP of more than 20 dBm. The graph on the right of FIG. 3 illustrates the relationship between the maximum allowed EIRP and the UE's LOS range. As is evident from this, reducing the maximum allowed EIRP dramatically impacts the range of the UE, thus deteriorating the signal quality received at the RAN node.

When an MPE event occurs (such as in case 2) at a UE connected/linked to a RAN node over a 5G NR FR2 carrier, the MPE restriction, i.e. reduction in the UE's UL transmission power, might be so severe that it causes a Radio Link Failure (RLF). Significantly reducing the output power (e.g. by at least 20 dB for PC3 UE's) is likely to lead to losing the connection to the RAN node and lead to an RLF, wherein the required power reduction, namely the Power Management Maximum Power Reduction (P-MPR), is too great to maintain the current link. The UE may be able to indicate the existence of the MPE event to the network (possibly including P-MPR value) before the occurrence of the RLF event so as the network can take appropriate corrective actions (e.g., handover, DC/CA reconfiguration).

At this point, the network only knows that the UE was operating in 5G NR FR2 and that the maximum allowed UL power is too limited to pursue communication due to an MPE event/MPE limitations. In case of non-standalone 5G operation, where an LTE anchor is required for control plane communication and mobility management, the network may transition the UE to LTE operation (i.e. E-UTRA), i.e. transition the 5G NR FR2 carrier to an LTE carrier. For example, this may occur when the UE informs the network that the 5G NR FR2 link has failed via a signalling procedure such as Secondary Cell Group (SCG) failure indication. Alternatively, the UE may autonomously transition to an LTE carrier with an RRC Re-establishment procedure when the primary link also fails. In case re-establishment is utilized, in examples of the disclosure, the UE may also indicate that the 5G NR FR2 link failed due to MPE reasons when transmitting the signalling informing to the network of the re-establishment causes.

For FR1 sub-6 GHz frequency operation, a SAR regulation applies which is different to the MPE regulation (which applied for over 6 GHz frequencies). Furthermore, the FR1 antenna may be located elsewhere on the UE than the FR2 antenna array. Hence whilst a user's body part (e.g. hand) may be in the path of transmissions from the FR2 antenna array, there may be no body parts of the user in the path of transmissions from the FR1 antenna. For these reasons, transiting from a 5G NR FR2 carrier to an LTE carrier may result in the UE not experiencing any UL power restrictions.

Figure 4:
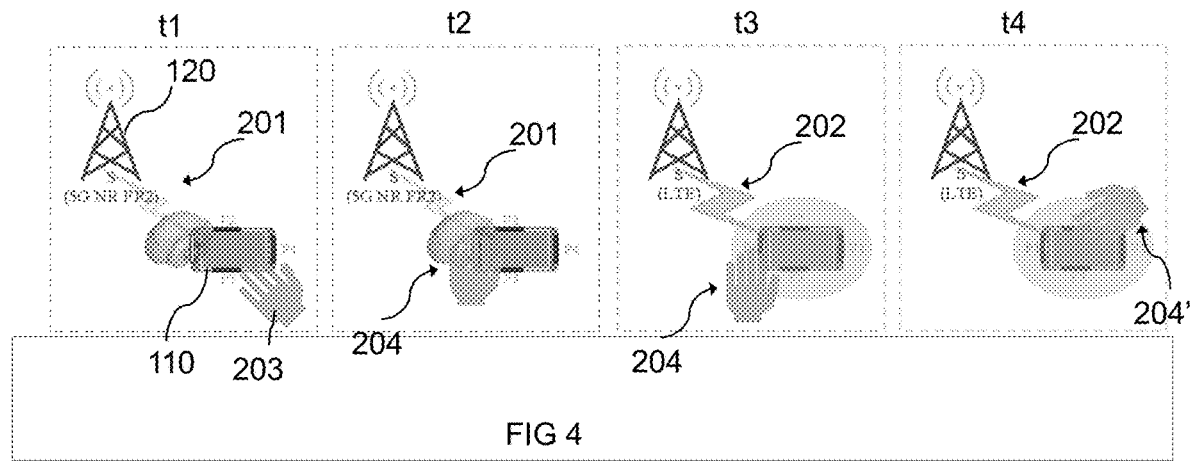
FIG. 4 schematically illustrates an example of transitioning a UE's from operating over a 5G NR FR2 carrier to operation over an LTE carrier.

FIG. 4 schematically illustrates an example of a 5G NR FR2 capable UE 110 transitioning from operating over a 5G NR FR2 carrier 201 to operation over an LTE carrier 202 due to an MPE event 204 in order to avoid an RLF.

Initially, at time t1, the UE 110 is operating wholly or partly (e.g., utilizing Carrier Aggregation (CA) and/or Dual Connectivity (DC)) over a 5G NR FR2 carrier 201 for which MPE protection/limits applies, and is connected to a serving gNB 120, i.e. the UE is in an RRC_Connected state. The user's hand 203 is not on the propagation path of the serving beam (from antenna panel P1) serving the RAN node, hence there is no MPE event. Whilst the UE is operating over 5G NR FR2, the UE is monitoring for MPE events.

At time t2, whilst the UE is still operating over a 5G NR FR2 carrier 201 and still in an RRC_Connected state with the serving gNB, the user covers the antenna panel P1.

The UE comprises proximity sensors, and dedicated components built into the UE device to detect nearby objects including humans and body parts. These components can be implemented in many ways including 60 GHz radars. Based on the proximity sensor, the UE can autonomously back off its transmission power to comply with MPE requirements. The proximity detectors may thereby detect and trigger an MPE event 204. The UE reports the existence of the MPE event 204 over the 5G NR FR2 carrier 201. The resultant restriction on UL transmission power is so severe that the UE is redirected to LTE, i.e. transition (e.g. via a handover, RLF, or CA/DC re-configuration) the 5G NR FR2 carrier to an LTE carrier for which MPE protection/limits do not apply.

At time t3, the antenna panel P1 is no longer operating over a 5G NR FR2 carrier. Instead, the UE is now connected over an LTE carrier 202.

Typically, operators have more spectrum available on 5G NR FR2 than on LTE sub-6 GHz. Therefore, it is desirable from the operator point of view to get the 5G NR FR2 capable UE back to FR2 operation as soon as it is feasible.

However, an issue suffered by conventional 5G NR FR2 capable UE's is that MPE event monitoring and reporting does not continue after the UE has been reconfigured to operate over LTE (since 5G and LTE operations are very different).

With the UE now operating on LTE, the network does not know when the UE is no longer experiencing the MPE event and when the UE is ready to resume 5G NR FR2 operation. The network is not aware of the current status of the MPE event on FR2 while connected through LTE, thus cannot optimally initiate the transition back to FR2.

As such, in order to redirect the UE back to 5G NR FR2 operation, conventionally the network will periodically request the UE to extend its operation back to FR2, which will be unsuccessful for as long as the MPE event is still active and ongoing, such as in FIG. 4 at time t3. Such uncoordinated procedures are not efficient from a network operation perspective, as it wastes resources to frequently attempt an unsuccessful FR2 link recovery.

At time t4, the antenna panel P1 is still not operating over a 5G NR FR2 carrier. Instead, the UE is still connected to the gNB over an LTE carrier 202. The user's hand has, however, moved away from panel P1 such that the MPE event associated with the 5G NR FR2 carrier has ceased/has been terminated such that there would no longer be an MPE restriction restricting the UE's UL power transmission were it to re-establish operation over a 5G NR FR2 carrier. However, since, for conventional UE's, there is no MPE monitoring nor reporting of MPE events to the network once the UE is no longer operating over a 5G NR FR2 carrier having been transitioned to an LTE carrier, the network is unaware of when the UE is ready to resume 5G NR FR2 operation.

Certain examples of the present disclosure seek to address such issues and optimize recovery to 5G NR FR2, having been reconfigured or transitioned to LTE due to an MPE event, when the MPE event ceases. Certain examples of the present disclosure seek to address optimize recovery to 5G NR FR2, having been reconfigured or transitioned to 5G NR FR1 due to an MPE event, when the MPE event ceases. Certain examples of the present disclosure seek to provide an improved process for restoring UE operation over a previously used carrier that had been subject to an MPE event.

In order to optimize resource utilization recovery (e.g. 5G NR FR2 carrier operation or indeed any high-frequency carrier operation subject to MPE limits, restraints and regulatory requirements), the network requires MPE information, such as relating to whether or not the UE is experiencing a severe FR2 MPE event anymore (i.e. whether or not the UE is detecting a human body part close to the UE any longer or the required power back-off is still severe).

Examples of the present disclosure provide a new signalling mechanism for the 3GPP specifications to enable the UE to be configured by the network/RAN node, through the second carrier, to keep on monitoring the MPE event over the first carrier and a status/condition of the same, and to autonomously/on-demand report an MPE termination/recovery event to the RAN node over the second carrier. In such a manner, although a UE capable of operating over a 5G NR FR2 carrier UE has stopped using the 5G NR FR2 carrier and has been transitioned to another carrier, e.g. an LTE carrier or an 5G FR1 carrier, due to the MPE event on the 5G NR FR2 carrier, the UE can still report an MPE event associated with the 5G NR FR2 carrier, e.g. indicate the termination/cessation or recovery of the MPE event to the network, whereupon the network can then move the UE back to a 5G NR FR2 carrier.

As will be discussed further below, in examples of the disclosure, the MPE event is monitored by the UE on 5G NR FR2 and reported to the network, even though the UE is currently no longer operating over the 5G NR FR2 carrier and is operating on LTE or 5G FR1 carrier. The UE indicates to the network that the MPE event has terminated (even if the situation where it would have used FR2 would have ended already). Such reporting of the status/condition of an MPE event, i.e. an indication as to the current status of the MPE as to whether it is still active or as ceased, may be:
event-triggered (e.g. UE determined that it is allowed UL power is above a certain threshold, which may be configured by the network),
periodic (i.e. sent periodically after initially first reporting the MPE event), according to a timer (i.e. the UE only reports to network if the MPE event ends within a configured or pre-determined duration),
or any combination of the above (e.g. event-triggered periodical reporting with a timer).

Such an indication of the status/condition of the MPE event may be effected by an MPE toggling bit (i.e. "MPE no longer required") in a transmitted signal/MPE report. The signal/MPE report could also additionally contain further information related to the MPE event e.g.: required power back-off, duration of time since the UE detected the MPE event termination, or other information related to the occurrence, duration of effects of the MPE termination.

Examples of the disclosure may thereby assist in the provision to the network (e.g. RAN node gNB or eNB) of MPE information. This may enable the network to only attempt FR2 usage when the MPE event has been terminated or has recovered/is no longer so severe, such that the UE is able to provide the required link budget, i.e. Power Back Off (PBO), to connect with the network over the 5G NR FR2 carrier. Implementation of examples of the disclosure do not require any new hardware and merely relies on the output of the proximity sensors already embedded in the UEs, i.e.

nearby user detection. The implementation relies on continuing the UE monitoring of the 5G NR FR2 MPE event status, after the UE has triggered the MPE event and been transitioned to a new carrier, even though the UE is not operating on 5G NR FR2 any longer. Based on a user-antenna separation distance, determined by sensors such as proximity sensors and based on measurements of reference signals (e.g., Synchronization Signal Block (SSB), Channel State Information-Reference Signal (CSI-RS) transmitted over the 5G NR2 carrier, a required power back-off of the UE on all or specific arrays can be determined. MPE monitoring on the UE is not resource or battery intensive and, indeed, it is likely that the UE would do aspects of MPE monitoring as it listens to e.g. SS burst for periodic link monitoring and initial access.

Figure 5:
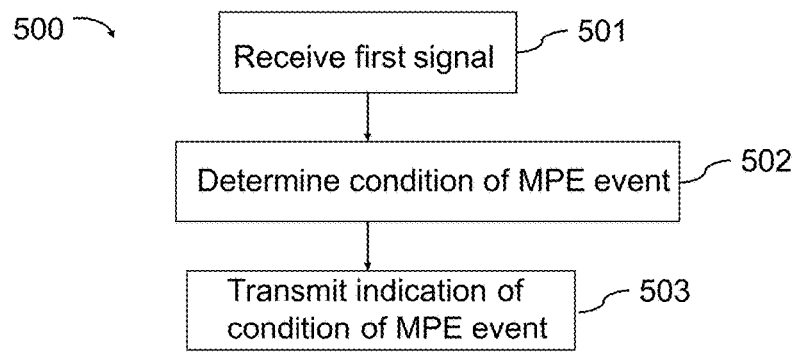
FIG. 5 schematically illustrates an example of a method according to the present disclosure.

FIG. 5 schematically illustrates an example of a method 500 according to the present disclosure that can be implemented by an apparatus such as a UE 110.

The method comprises, at block 501, following a MPE event occurring during operation over a first carrier such that the UE is no longer operating over the first carrier, a first signal is received, over a second carrier, for configuring the UE to determine a status (or a condition) of the MPE event associated with a previously used first carrier;

In some examples, based at least in part on the MPE event during operation over the first carrier, the UE ceases to operate over the first carrier. In some examples, the UE may detect the occurrence of the MPE event during operation over a first carrier and, responsive to the same, the UE ceases to operate over the first carrier. In some examples, due to the MPE event, the UE may be transitioned from operating over the first carrier to operating over the second carrier such that the UE is no longer operating over the first carrier. The transition may be a re-configuration, a re-connection, or a hand over, i.e. such that apparatus no longer operating over the first carrier. The transition may be an orderly/managed transition wherein an initial detection of the existence of the MPE event is signalled to the network, responsive to which the network initiates a re-configuration or hand over procedure, thereby transitioning the apparatus from the first to the second carrier. In some examples, the transition may be a non-network-initiated transition, for example wherein, due to an MPE event and resultant MPE restriction requiring a severe reduction in the UE's UL transmission power, an RLF occurs following which the apparatus initiates a re-connection procedure.

The first carrier could be, for example a 5G NR FR2 carrier utilising frequencies greater than 24 GHz and/or between 24 GHz and 52 GHz. The first carrier could be a carrier at some other high frequency range that is subject to MPE limits, i.e. >6 GHZ, not least a 52-114 GHz of a potential future Frequency Range 3 (FR3). The first carrier could be a carrier of: a single connectivity link, MR-DC connectivity, CA connectivity, or even CA in MR-DC.

The second carrier could be a carrier different to the first carrier. The second carrier could be, for example an LTE carrier utilizing frequencies between 400 MHz and 6 GHz. The second carrier could be a 5G NR FR1 carrier operating at sub 6 GHZ frequencies (for which MPE limits do not apply). In some examples, such as where NR-DC connectivity, or CA in 5G NR FR2 is in operation, the second carrier could be another 5G NR FR2, albeit one that is not affected by the (or another) MPE event. In some examples, the second carrier could be a carrier at some other high frequency range, i.e. >6 GHZ, again albeit one that is not affected by the (or another) MPE event. The second carrier could be a carrier of: a single connectivity link, MR-DC connectivity, CA connectivity, or even CA in MR-DC.

Initially, the UE may be in operation over at least the first carrier, i.e. the UE may be connected to one or more RAN nodes wholly or partially (e.g. via MR-DC connectivity, CA connectivity, or even CA in MR-DC) over the first carrier. Whereas, after the MPE event, the UE is no longer operating over the first carrier and is operating over at least the second carrier, i.e. the UE may be connected to one or more RAN nodes wholly or partially over the second carrier. Initially, i.e. prior to the MPE event on the first carrier, the UE may be in operation over the first carrier and at least the second carrier (e.g. via MR-DC connectivity, not least such as EN-DC), whereas, after the MPE event the UE is no longer operating over the first carrier and is operating over at least the second carrier (i.e. UE ceases operation over the first carrier and continues operation over the second carrier).

The MPE event may relate to one or more of: detection of user body part in propagation pathway of UL transmissions from apparatus operative over first carrier; detection of proximity/distance of user body part to apparatus (i.e. distance less than threshold values), determination of UL transmission power back off required to comply with MPE limits/tolerances, determination of a maximum allowed UL transmission power that complies with MPE limits and/or comparing the same to a minimum UL transmission power for sustain a radio link/connection over the first carrier (which may be determined based, not least in part on monitoring reference signals from the RAN node over the first carrier).

The status/condition of the MPE event associated with the previously used first carrier may be a status of the MPE event, e.g. a current status of the same, such as whether the MPE event over the first carrier is still active (condition=ON) or if it has terminated/recovered (condition=OFF).

At block 502, responsive to receipt of the first signal, a determination is made as to the status/condition of the MPE event associated with the previously used first carrier.

The receipt of the first signal thereby configures the UE to continue to monitor the MPE event, e.g. continue to detect the presence and proximity of a user's body part to the UE/antenna panel, and determining whether an MPE restriction is required to ensure MPE compliance, e.g. reducing a UL transmission power.

At block 503, responsive to receipt of the first signal, a second signal is transmitted over the second carrier, wherein the second signal comprises an indication of the current status/condition of the MPE event associated with the previously used first carrier.

Examples of the disclosure may thereby provide signalling that configures the UE to continue to monitor the MPE event even through the UE has stopped using the first carrier (for example the UE may have been transitioned from operating over a 5G NR FR2 carrier to operating over a second carrier). Moreover, such monitoring can be used to determine a current status/condition of the MPE event, e.g. whether it has terminated, which is signalled to a RAN node over the second carrier. Advantageously, this may thereby provide the requisite information to the RAN node for enabling it to decide whether or not to resume operation of the UE over the 5G NR FR2 carrier. Examples of the disclosure may thereby enable optimum 5G NR FR2 resource utilization and optimum link recovery/carrier re-establishment, i.e. for optimum spectrum and resource allocation.

In some examples, the first signal, which may be an RRC message, configures the UE to monitor a status of the MPE event associated with the previously used first carrier. Responsive to receipt of the first signal, the current status of the MPE event associated with the previously used first carrier is monitored whilst the UE is still operating over the second carrier and is no longer operating over the first carrier. The UE may comprise means for continuing to monitor the first carrier in spite of having been transitioned to the second carrier. Such means may comprise, not least, one or more antennas/antenna panels of the UE that are configured for reception of signals (such as reference signals) at the frequency of the first carrier (such as 5G NR FR2), and measuring signal characteristics of the same (such as measuring the power and quality of the received signals, e.g. Reference Signal Received Power (RSRP) and (RSRQ)). Based on such signal measurements, as well as measurements of user proximity to the UE/antenna/antenna panels of the same via sensors such as proximity detectors, and required transmission power back off, i.e. P-MPR, can be determine for complying with MPE limits. Thus, such MPE related information related to the MPE event associated with the previously used first carrier can be determined whilst the UE is no longer using the first carrier, e.g. having been transitioned therefrom to the second carrier.

In some examples, the first signal is a request for MPE information and the second signal is a report of MPE information related to the MPE event. The second signal may be transmitted via RRC or MAC signalling (as will be discussed further below).

The first signal may configure the UE's report, e.g. its content and when it is to be transmitted. The second signal may comprise an indication of one or more of the following:
whether the MPE event is active/still present;
whether the MPE event has ceased/terminated/recovered/ is no longer present;
a power reduction value, i.e. P-MPR required to comply with MPE limits;
a UL transmission power, i.e. a maximum permitted UL transmission power for complying with MPE limits;
an expected probability of the MPE event re-occurring, this may be determined based on a machine learning of typical use/past MPE events;
one or more signal level parameter values, i.e. measurements of reference signals to determine for example RSRP and RSRQ; and
an amount of time elapsed following the MPE event;
an amount of time elapsed following a transition from operation over the first carrier to the second carrier.

Various of the above may be determined/measured for on all or specific array's/receiving beams of the UE for 5G NR FR2 reception.

In some examples, the second signal is transmitted:
periodically;
based at least in part on a timer,
in response to a condition being satisfied, e.g. upon a determination that there is no longer a user's body part in the propagation path of the first carrier, and/or in response to a further signal/new request for MPE information.

The first signal may configure on what basis the second signal is sent, i.e. what triggers the sending of the second signal (for example, transmitting the second in signal in response to determining that measured/determined signal characteristic value of a received reference signal satisfy a criterion with respect to a threshold signal characteristic value set by the RAN node in its first signal).

In some examples, determining the current status/condition of the MPE event comprises:
means for detecting a proximity of a user's body part to an antenna of the UE; and/or
means for measuring one or more characteristics of one or more reference signals (SSB, CSI-RS) received over the first carrier.

In some examples, the UE detects an initial occurrence of the MPE event during UE operation over the first carrier (for example, such a detection may occur whilst the UE is operating over the first carrier and prior to a transition of the UE to operating over the second carrier). The UE may determine a loss of connection over the first carrier, e.g. a radio link failure. Responsive to the detection of the MPE event and the determination of the loss connection over the first carrier, the UE may transmit one or more signals for requesting connection over the second carrier. Such one or more signals could be RRC signalling, e.g. RRC messages such as an RRC CONNECTION REQUEST message or an RRC CONNECTION REESTABLISHMENT REQUEST message. In cases where re-establishment is utilized, the UE may also indicate, when transmitting signalling informing the network of the re-establishment causes, that the loss of connection over the first carrier was due to MPE reasons.

Figure 6:
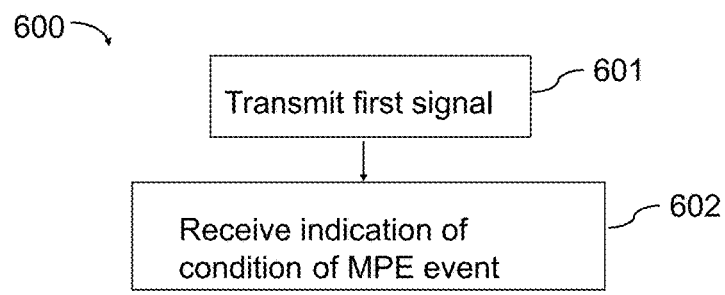
FIG. 6 schematically illustrates an example of a further method according to the present disclosure.

FIG. 6 schematically illustrates an example of a method 600 according to the present disclosure that can be implemented by an apparatus such as a RAN node 120.

At block 601, the RAN node, following an MPE event occurring during operation of a UE over a first carrier such that the UE is no longer operating over the first carrier, transmits a first signal, over a second carrier, for configuring the UE to determine a status/condition of the MPE event associated with the previously used first carrier.

In some examples, the UE ceases to operate over the first carrier based at least in part on the MPE event during operation over the first carrier. In some examples, the UE may be transitioned from operating over the first carrier to operating over the second carrier such that the UE is no longer operating over the first carrier. The transition may be a re-configuration, a re-connection, or a hand over, i.e. such that apparatus no longer operating over the first carrier.

At block 602, responsive to transmission of the first signal, the RAN node receives a second signal over the second carrier, wherein the second signal comprises an indication of the current status/condition of the MPE event associated with the previously used first carrier.

In some examples, based at least in part on the received second signal, the RAN node can determine whether to re-establish operation of the UE over the first carrier. Such a determination may also take into account one or more radio conditions of the first carrier, such as its current traffic load. Responsive to the determination, the RAN node may decide to re-establish operation of the UE over the first carrier and effect the appropriate procedure in this regard, e.g. to transition the UE back to operation over the 5G NR FR2 carrier.

In some examples, prior to transmission of the first signal, the RAN node receives a signal from the UE for requesting connection over the second carrier, wherein the signal comprises an indication of the occurrence of an MPE event associated with the previously used first carrier. Such a signal may thereby indicate to the RAN node that the UE had previously been connected over a first carrier but, due to an MPE event, lost connection. Such a signal may thereby trigger the RAN node to transmit, once a connection over the second carrier has been established, the first signal for requesting a status/condition of the MPE event associated with the previously used first carrier.

Figure 7:
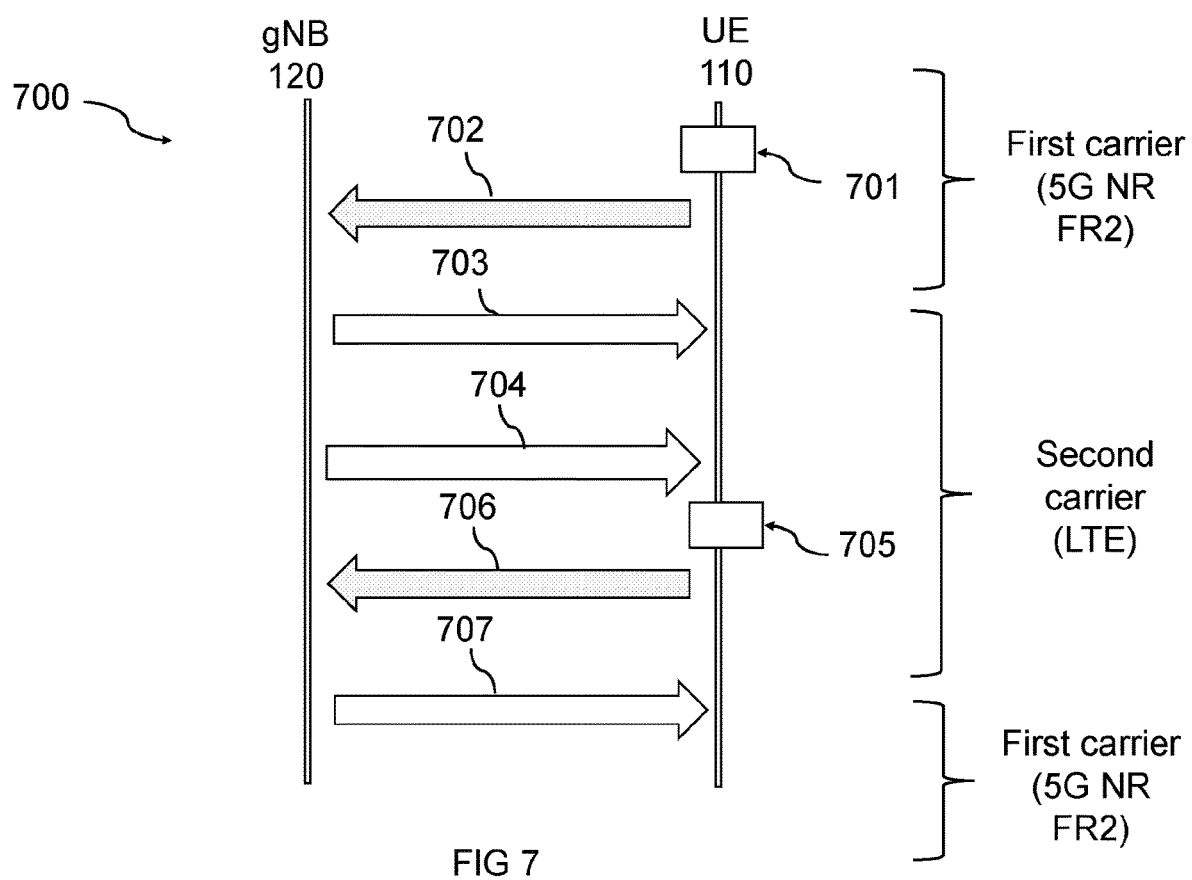
FIG. 7 schematically illustrates an example of signalling between a RAN node and a UE according to the present disclosure.

FIG. 7 schematically illustrates an example of signalling 700 between a UE 110 and a RAN node 120 according to the present disclosure.

Initially, the UE is connected (i.e. is in RCC CONNECTED state) to the RAN node over a first carrier, e.g. 5G NR FR2 carrier. Following detection of an MPE event at 701 (e.g., a user's body part in the path of the UE's 5G NR FR2 UL transmission beam), at 702 the UE signals a report of the MPE event to the RAN node. Responsive to the MPE report, at 703 the RAN node signals the UE to reconfigure the UE to operate over the second carrier.

At 704, whilst the UE is connected (i.e. is in RCC CONNECTED state) to the RAN node over the second carrier, e.g. LTE carrier or a 5G FR1 carrier, the RAN node transmits the first signal which is received by the UE. Responsive to receipt of the first signal, the UE continues to monitor the MPE event over the first carrier. At 705 the UE determines that the MPE event has terminated. This may be due, for example to a determination that the user's body part has moved such that it would no longer be in the path of a 5G NR FR2 UL transmission beam. Alternatively, it may be due to determining that the required minimum UL transmission power for maintaining a 5G NR FR2 connection has reduced to a level below the maximum allowed UL transmission power that still complies with MPE limits, for example, the UE may have changed position/moved closer to the RAN node or the radio conditions may otherwise be favourable for 5G NR FR2 connection.

Responsive to the determination that the MPE event has terminated, at 706, this triggers the UE to transmit the second signal, comprising an indication of the termination of the MPE event.

At 707, responsive to receipt of the second signal indicating the that the MPE event has terminated, the RAN node may trigger a procedure to reconfigure the UE to operate over the first carrier, 5G NR FR2 carrier, once more.

The various examples discussed above have primarily been described with respect the UE transitioning the connection from the RAN node from 5G NR FR2 to LTE, and then back to 5G NR FR2. However, it is to be appreciated that examples of the present disclosure are applicable to other configurations, not least such as Dual Connectivity (DC) and Carrier Aggregation (CA).

In DC, the UE can simultaneously transmit and receive data on multiple component carriers from two cell groups via a master RAN node, Master Node (MN), and a secondary RAN node, Secondary Node (SN), wherein each cell group contains at least one carrier (i.e. such that the MN and/or the SN may have multiple carriers). The first carrier and the second carrier may be component carriers for either of the master RAN node and the secondary RAN node.

In CA, the UE can simultaneously transmit and receive data on multiple component carriers from a single RAN node. The first carrier and the second carrier can be component carriers of the multiple component carriers of the RAN node in CA.

In DC-CA, the UE can simultaneously transmit and receive data on multiple component carriers from the master RAN node and/or the secondary RAN node. The first carrier and the second carrier can be component carriers of such multiple component carriers for the master and/or secondary RAN nodes in DC-CA.

Figure 8:
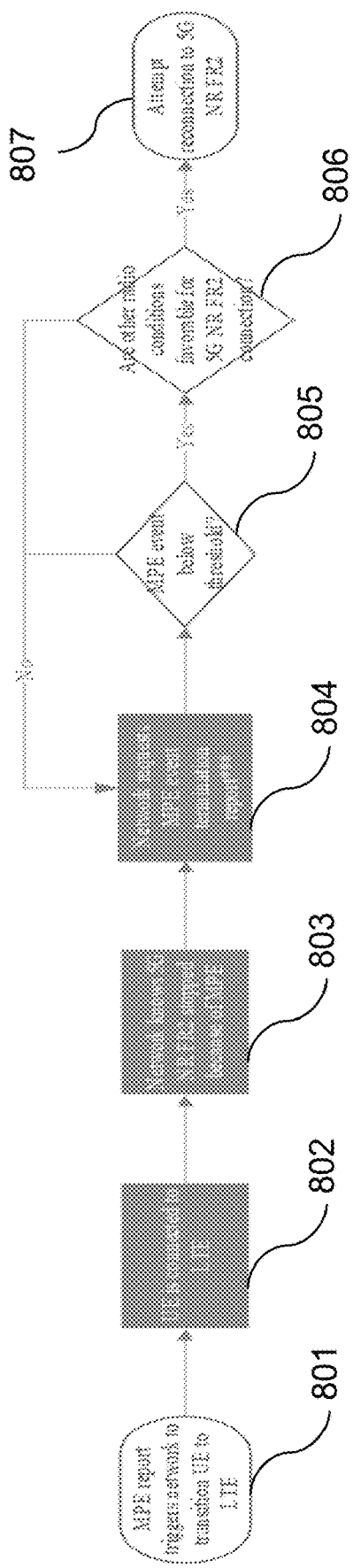
FIG. 8 schematically illustrates an example of a reconnection process according to the present disclosure.

FIG. 8 schematically illustrates an example of a reconnection process according to the present disclosure. The Figure shows a flowchart of the procedures of a UE and a RAN node.

As indicated at block 801, the RAN node's receipt of an MPE report, indicating the existence of an MPE event affecting 5G NR FR2 (e.g. signal 702 discussed above) triggers the network (operating under non-standalone 5G with an LTE anchor) to transition the UE from 5G NR FR2 to LTE. Based on the MPE report, it may be determined that the P-MPR required on 5G NR FR2 is so high that the network decides it is safest (i.e. to comply with MPE limits and avoid RLF) to transition the UE to LTE. As indicated at block 802 the UE has been transitioned to and is connected to LTE. As indicated at block 803, due to receipt of the MPE report, the network is made aware that a previous 5G NR FR2 connection stopped due to an MPE event.

As indicated at block 804, the network requests an MPE event termination report (similar to the transmission of signal 704 and the 'first signal' discussed in the above examples). The MPE termination report may be configured by the network, such as with regards to its information content and when it is to be transmitted to the RAN node. In some examples the report is autonomously sent by the UE.

In response to receipt of the request, the UE continues to monitor 5G NR FR2 related aspects/events, including not least a current status of the 5G NR FR2 MPE event, even though the UE has no 5G NR FR2 configuration or communication ongoing. The UE transmits the MPE report to the RAN node via the active LTE carrier.

As indicated in block 805, based on the received MPE report, the RAN node determines whether the MPE event has terminated, or has become less severe/sufficiently abated such that the required MPE restriction of UE transmission power is not too high so as to be below an acceptable minimum UE UL transmission power for 5G NR FR2 connection over a 5G NR FR2 carrier. If so, the flow chart proceeds to block 806, else the process loops back to block 804 and awaits a subsequent further MPE report.

As indicated in block 806, which may be optional, the RAN node determines whether other radio conditions (e.g. current traffic load over the 5G NR FR2 cell) are favourable/amenable to reconnecting to 5G NR FR2. If so, the flow chart may proceed to block 807; else the process may loop back to block 804 and await a subsequent further MPE report. It is to be appreciated that the order of blocks 805 and 806 is interchangeable.

As indicated in block 807, following successful determinations in blocks 805 and 806, the RAN attempts to reconnect the UE to 5G NR FR2.

FIG. 8 represents the case where a managed/orderly transition from 5G NR FR2 to LTE is performed, due to the RAN node having received the initial MPE report at block 801 and being able to take remedial action to avoid RLF and reconfigure the UE for LTE operation over an LTE carrier.

Figure 9:
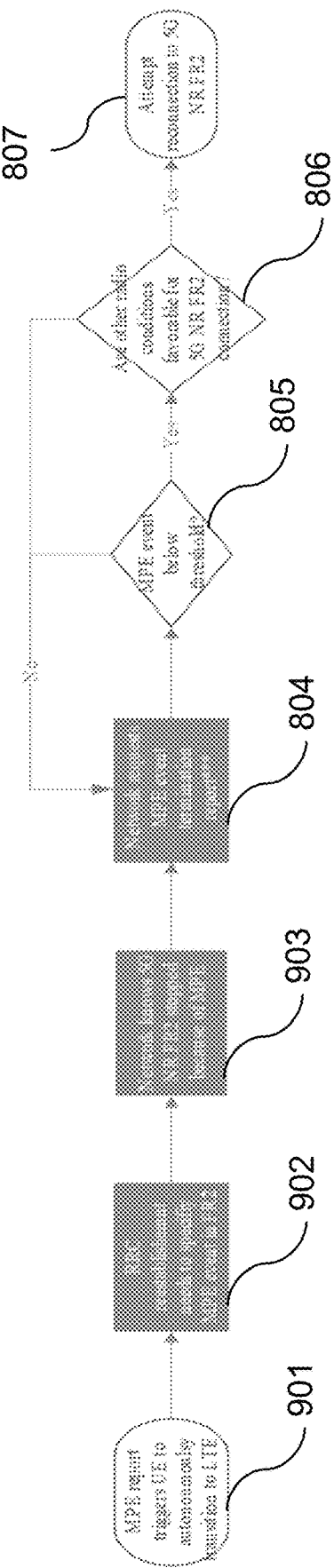
FIG. 9 schematically illustrates a further example of a reconnection process according to the present disclosure.

FIG. 9 schematically illustrates a further example of a reconnection process according to the present disclosure. FIG. 9 represents the case where a network managed transition from 5G NR FR2 to LTE is unable to be performed and avoid RLF. For example:

the UE may have been unable to transmit its MPE report to the RAN node, the MPE report may have been transmitted but the RAN node never received it and the UE did not have sufficient UL transmission budget to repeat a transmission of the MPE report before expiry of an RLF timer, or the RAN node was unable to take timely remedial action to reconfigure the UE for LTE operation over an LTE carrier before the RLF timer ran out.

Consequently, as indicated in block 902, the UE needs to request to connect to the network, i.e. via an RRC message. However, since the UE may connect to a different RAN node than it was previously connected with, the new RAN node is unaware of the MPE event over the previous 5G NR FR2 connection with the previously connected RAN node. Accordingly, in examples of the disclosure, the RRC message requesting connection include an indication of the occurrence of the 5G NR FR2 MPE event, possibly with an identification of the affected 5G NR FR2 carrier. Hence, as indicated at block 804, the network, e.g. the newly connected RAN node different from the previously connected RAN node, is aware that the previous 5G NR FR2 connection stopped due to an MPE event.

The remainder of the blocks shown in FIGS. 9 (805-807) are the same as those described above for FIG. 8.

With the proposed approach set out in the present disclosure, the network will only attempt the MPE-event carrier (e.g. 5G NR FR2) link reconfiguration once it knows both inputs:

1) the UE is able to again use the MPE-event carrier (e.g. 5G NR FR2) (i.e. MPE event ended and/or the UL power is sufficient)

2) the MPE-event carrier (e.g. FR2) system and radio conditions are suitable (e.g. UE detects that the radio conditions meet required conditions configured by network or determined by UE autonomously).

MPE-event carrier (e.g. 5G NR FR2) link recovery is optimized after MPE events, meaning that:

1) The UE operating on LTE should get back to the MPE-event carrier (e.g. 5G NR FR2) as soon as the MPE event stops 2) The network should not waste resources by frequently requesting to switch to the MPE-event carrier (e.g. 5G NR FR2) while the MPE event is still in force.

Further use cases of examples of the present disclosure will now be described.

The following use cases are considered:

1) MPE event during MR-DC connectivity with
   a. SN uses only FR2 carriers (i.e. FR1-FR2 DC)
   b. SN uses both FR1 and FR2 carriers (i.e. FR1-FR2 CA in SN)

2) MPE event during NR-DC connectivity with
   a. MN using FR1 and SN using FR2 (i.e. FR1-FR2 DC)
   b. Both MN and SN using FR2 (i.e. FR1-FR2 CA in SN)
   c. MN using FR2 and SN using FR1 (i.e. FR2-FR2 DC)

For both cases, there are several potential responses from network to UE:

I. Release SN and fall back to MN operation
II. Handover to another cell/RAT upon detection of MPE
III. Allow UE to trigger RLF or S-RLF upon MPE (leading to either RRC re-establishment or Secondary Cell Group (SCG) failure indication to MN)

While the exact signalling varies depending on the used combination, the commonality is that the UE is no longer utilizing the carrier for which the MPE event occurred when being triggered to report the MPE event termination. The following basic logic is the same for all of these cases:

UE detects and reports MPE on a carrier

Network resolves the MPE problem via release or change of some or all of the serving cells (network behaviour, only applicable to certain different starting conditions). This could result in the UE operating under LTE or NR, but either using non-FR2 frequencies or having FR2 frequencies deactivated (i.e. measured but not used) or suspended (neither measured not used), and thus being unable to utilize the carrier where the MPE event occurred. The network determines whether to allow MPE event termination/recovery signalling.

UE detects termination of the previously triggered MPE event and reports this to network using currently utilized carrier(s), including information related to the MPE event The two aspects of examples of the present disclosure are:

1) MPE event termination/recovery signalling mechanism and

2) MPE event termination/recovery signalling content.

For 1), the signalling can be either RRC or MAC CE:

For RRC, the signalling can be UE-initiated (e.g. ULInformationTransferMRDC, UEAssistanceInformation), or polled network by the (e.g. UEInformationRequest and UEInformationResponse)

For MAC CE, the information can be fully triggered by UE (e.g. new UL MAC CE) or have also a request and response (e.g. new UL MAC CE followed by a new DL MAC CE as response to stop further reporting)

For 2), at least the following information can be considered:

Currently used P-MPR

Currently available FR2 UL transmission power

Time since MPE event termination/recovery event detection

Expected probability of MPE event occurring again (based on e.g. a UE Machine learning algorithm)

Signal level of FR2 carriers detected by UE or configured by network (in case UE is measuring the FR2 carriers)

Any combination of the above

Various examples of the disclosure provide a mechanism to inform the network of a status/condition of the MPE event, and hence of the ability to resume operation over 5G NR FR2 (for example after an autonomous or network-configured transition to LTE following a radio link failure on 5G NR FR2 caused where the MPE event is severe). The following are example approaches for the network to be informed on MPE event status before attempting to again use the 5G NR FR2 carrier:

The UE autonomously triggers reporting for MPE event termination when no user blockage is detected.

The network configures periodic MPE event updates (e.g. frame-based reports) from the UE.

The network polls the UE for a report when it would like to configure 5G NR FR2 (e.g. when configuring EN-DC with a 5G NR FR2 carrier) and the UE sends a poll response (e.g. via RRC or MAC signalling as discussed below).

The network configures the MPE event termination report with e.g. a UL power threshold that indicates UE should report the event when its available UL power (i.e.

complying with MPE limits in view of the MPE event) is over the threshold.

Examples of signalling for use examples of the present disclosure will now be described.

Signalling for indicating an MPE event termination/recovery may be via RRC or MAC signalling. There are various alternatives, 1) and 2) set out below, for the RRC/MAC signalling to indicate the MAC CE:

1) RRC signalling using OtherConfig and UEAssistanceInformation (network-configured, UE-triggered). The network may indicate, via such RRC signalling, that UE is allowed to send the assistance information for MPE event termination/recovery when it occurs using the existing UEAssistanceInformation-message.

An example of this is shown below (N.B. the highlighted parts indicate the new configuration/new IE's):

-OtherConfig

The IE OtherConfig contains configuration related to other configuration.

OtherConfig information element
--ASN1START
OtherConfig-r9::=SEQUENCE {
   reportProximityConfig-r9 ReportProximityConfig-r9
     OPTIONAL, --Need ON
   [[idc-Config-r11 IDC-Config-r11
     OPTIONAL, --Need ON
     powerPrefIndicationConfig-r11 PowerPrefIndication-Config-r11
     OPTIONAL, --Need ON
     obtainLocationConfig-r11 ObtainLocationConfig-r11
     OPTIONAL --Need ON
   ]],
   [[bw-Preference IndicationTimer-r14 ENUMERATED
     {s0, s0dot5, s1, s2, s5, s10, s20,
     s30, s60, s90, s120, s300, s600, spare3,
     spare2, spare1}
   OPTIONAL,--Need OR
     sps-AssistanceInfoReport-r14 BOOLEAN
       OPTIONAL,--Need ON
     delayBudgetReportingConfig-r14 CHOICE {
       release NULL,
       setup SEQUENCE{
         delayBudgetReportingProhibitTimer-r14 ENUMERATED {
           s0, s0dot4, s0dot8,
           s1dot6, s3, s6, s12, s30}
     } OPTIONAL,--Need ON
     rlm-ReportConfig-r14 CHOICE {
       release NULL,
       setup SEQUENCE {
         rlmReportTimer-r14 ENUMERATED {s0, s0dot5, s1, s2, s5, s10, s20, s30,
         s60, s90, s120, s300, s600, spare3, spare2, spare1},
         rlmReportRep-MPDCCH-r14 ENUMERATED {setup}
     OPTIONAL --Need OR
     }
   } OPTIONAL --Need ON
   ]],
   [[overheatingAssistanceConfig-r14 CHOICE{
     release NULL,
     setup SEQUENCE{
       overheatingIndicationProhibitTimer-r14 ENUMERATED {s0, s0dot5, s1, s2, s5, s10,
       s20, s30, s60, s90, s120, s300, s600,
       spare3, spare2, spare1}
     }
   } OPTIONAL --Need ON
   ]],
   [[measConfigAppLayer-r15 CHOICE{
     release NULL,
     setup SEQUENCE{
       measConfigAppLayerContainer-r15 OCTET STRING (SIZE (1 . . . 1000)),
       serviceType-r15 ENUMERATED {qoe, qoemtsi, spare6, spare5, spare4, spare3, spare2, spare1}
     }
   } OPTIONAL, --Need ON
   ailc-BitConfig-r15 BOOLEAN
     OPTIONAL, --Need ON
   bt-NameListConfig-r15 BT-NameListConfig-r15
     OPTIONAL, --Need ON
   wlan-NameListConfig-r15 WLAN-NameListConfig-r15
     OPTIONAL --Need ON
   ]]
   [[mpe-AssistanceConfig-rxx CHOICE {
     release NULL,
     setup SEQUENCE{
       mpe-IndicationProhibitTimer-r14 ENUMERATED {s0, s0dot5, s1, s2, s5, s10,
       s20, s30, s60, s90, s120, s300, s600,
       spare3, spare2, spare1}
     }
   } OPTIONAL --Need ON
   ]]
}
UNNECESSARY PARTS OMITTED
--ASN1STOP
-UEAssistanceInformation The UEAssistanceInformation message is used for the indication of UE assistance information to the eNB.

Signalling radio bearer: SRB1
RLC-SAP: AM
Logical channel: DCCH
Direction: UE to E-UTRAN
UEAssistanceInformation message
--ASN1START
UEAssistanceInformation-r11::=SEQUENCE {
   criticalExtensions CHOICE {
     c1 CHOICE {
       ueAssistanceInformation-r11 UEAssistance Information-r11-IEs,
       spare3 NULL, spare2 NULL, spare1 NULL
     },
     criticalExtensionsFuture SEQUENCE { }
   }
}
UEAssistanceInformation-r11-IEs::=SEQUENCE {
   powerPrefIndication-r11 ENUMERATED {normal, lowPowerConsumption} OPTIONAL,
   lateNonCriticalExtension OCTET STRING
     OPTIONAL,
   nonCriticalExtension UEAssistanceInformation-v1430-IEs
     OPTIONAL
}

```
UEAssistance Information-v1430-IEs::=SEQUENCE {
    bw-Preference-r14 BW-Preference-r14
        OPTIONAL,
    sps-Assistance Information-r14 SEQUENCE {
        trafficPatternInfoListSL-r14    TrafficPatternInfoList-
            r14
            OPTIONAL,
        trafficPatternInfoListUL-r14    TrafficPatternInfoList-
            r14
            OPTIONAL
    } OPTIONAL,
    rlm-Report-r14 SEQUENCE {
        rlm-Event-r14 ENUMERATED {earlyOutOfSync,
            early InSync},
        excessRep-MPDCCH-r14            ENUMERATED
            {excessRep1, excessRep2} OPTIONAL}
    }
    OPTIONAL,
    delayBudgetReport-r14 DelayBudgetReport-r14
        OPTIONAL,
    nonCriticalExtension        UEAssistanceInformation-
        v1450-IEs OPTIONAL
}
UEAssistance Information-v1450-IEs::=SEQUENCE {
    overheatingAssistance-r14 OverheatingAssistance-r14
        OPTIONAL,
    nonCriticalExtension        UEAssistanceInformation-
        v1530-IEs OPTIONAL
}
UEAssistance Information-v1530-IEs::=SEQUENCE {
    sps-AssistanceInformation-v1530 SEQUENCE {
        trafficPatternInfoListSL-v1530    TrafficPatternInfo-
            List-v1530
    } OPTIONAL,
    nonCriticalExtension    UEAssistance    Information-
        v16xy-IEs OPTIONAL
}
UEAssistanceInformation-v16xy-IEs::=SEQUENCE {
    mpe-Report-rxx MPE-Report-rxx
        OPTIONAL,
    nonCriticalExtension SEQUENCE { }
        OPTIONAL
}
MPE-Report-rxx::=SEQUENCE {
    mpe-Detected BOOLEAN,
    fr2-MeasResult-rxx SEQUENCE {
        rsrpResult-rxx RSRP-Range,
        rsrqResult-rxx RSRQ-Range
        OPTIONAL
    } OPTIONAL,
    mpe-Duration InSeconds TimeSinceFailure-r11
        OPTIONAL,
    . . .
}
--UNNECESSARY PARTS OMITTED
--ASN1STOP
```

2) RRC signalling using UEInformationRequest/UEInformationResponse (polling from the network). The network may also actively poll the UE to report the information via existing RRC request-response mechanisms as shown below (N.B. the highlighted parts indicate the new configuration/new IE's):

UEInformationRequest

The UEInformationRequest is the command used by E-UTRAN to retrieve information from the UE.
Signalling radio bearer: SRB1
RLC-SAP: AM
Logical channel: DCCH
Direction: E-UTRAN to UE
UEInformationRequest Message

```
--ASN1START
UEInformationRequest-r9::=SEQUENCE {
    rrc-TransactionIdentifier RRC-TransactionIdentifier,
    criticalExtensions CHOICE {
        c1 CHOICE {
            ueInformationRequest-r9 UEInformationRequest-
                r9-IEs,
            spare3 NULL, spare2 NULL, spare1 NULL},
        },
        criticalExtensionsFuture SEQUENCE { }
    }
}
UEInformationRequest-r9-IEs::=SEQUENCE {BOOLEAN,
    rach-ReportReq-r9 BOOLEAN,
    rlf-ReportReq-r9 BOOLEAN,
    nonCriticalExtension    UEInformationRequest-v930-
        IEs
    OPTIONAL
}
UEInformationRequest-v930-IEs::=SEQUENCE {
    lateNonCriticalExtension OCTET STRING
        OPTIONAL,
    nonCriticalExtension    UEInformationRequest-v1020-
        IEs
    OPTIONAL
}
UEInformationRequest-v1020-IEs::=SEQUENCE {
    logMeasReportReq-r10 ENUMERATED {true}
    OPTIONAL, --Need ON
    nonCriticalExtension    UEInformationRequest-v1130-
        IEs
    OPTIONAL
}
UEInformationRequest-v1130-IEs::=SEQUENCE {
    connEstFailReportReq-r11 ENUMERATED {true}
    OPTIONAL, --Need ON
    nonCriticalExtension    UEInformationRequest-v1250-
        IEs
    OPTIONAL
}
UEInformationRequest-v1250-IEs::=SEQUENCE {
    mobilityHistoryReportReq-r12        ENUMERATED
        {true}
    OPTIONAL, --Need ON
    nonCriticalExtension    UEInformationRequest-v1530-
        IES
    OPTIONAL
}
UEInformationRequest-v1530-IEs::=SEQUENCE {
    idleModeMeasurementReq-r15        ENUMERATED
        {true}
    OPTIONAL, --Need ON
    flightPathInfoReq-r15 FlightPathInfoReportConfig-r15
    OPTIONAL, --Need ON
    nonCriticalExtension    UEInformationRequest-v16xy-
        IEs
    OPTIONAL
}
```

```
UEInformationRequest-v16xy-IEs::=SEQUENCE {
    mpe-InformationRequest-rxx ENUMERATED {true}
        OPTIONAL, --Need ON
    nonCriticalExtension SEQUENCE { }
        OPTIONAL
}
```
--UNNECESSARY PARTS OMITTED
--ASN1STOP
-UEInformationResponse
The UEInformationResponse message is used by the UE to transfer the information requested by the E-UTRAN.
   Signalling radio bearer: SRB1 or SRB2 (when logged measurement information is included)
   RLC-SAP: AM
   Logical channel: DCCH
   Direction: UE to E-UTRAN
UEInformationResponse Message
--ASN1START
```
UEInformationResponse-r9 SEQUENCE {
    rrc-TransactionIdentifier RRC-TransactionIdentifier,
    criticalExtensions CHOICE {
        c1 CHOICE {
            ueInformationResponse-r9    UEInformationRe-
                sponse-r9-IEs,
            spare3 NULL, spare2 NULL, spare1 NULL
        },
        criticalExtensionsFuture SEQUENCE { }
    }
}
UEInformationResponse-r9-IEs::=SEQUENCE {
    rach-Report-r9 SEQUENCE {
        numberOfPreamblesSent-r9 NumberOfPreamblesS-
            ent-r11,
        contentionDetected-r9 BOOLEAN
    } OPTIONAL,
    rlf-Report-r9 RLF-Report-r9
        OPTIONAL,
    nonCriticalExtension    UEInformationResponse-v930-
        IEs
        OPTIONAL
}
```
--Late Non Critical Extensions
```
UEInformationResponse-v9e0-IEs::=SEQUENCE {
    rlf-Report-v9e0 RLF-Report-v9e0
        OPTIONAL,
    nonCriticalExtension SEQUENCE { }
        OPTIONAL
}
```
--Regular Non Critical Extensions
```
UEInformationResponse-v930-IEs::=SEQUENCE {
    lateNonCriticalExtension OCTET STRING (CON-
        TAINING        UEInformationResponse-v9e0-IEs)
        OPTIONAL,
    nonCriticalExtension UEInformationResponse-v1020-
        IEs
        OPTIONAL
}
UEInformationResponse-v1020-IEs::=SEQUENCE {
    logMeasReport-r10 LogMeasReport-r10
        OPTIONAL,
    nonCriticalExtension UEInformationResponse-v1130-
        IEs
        OPTIONAL
}
UEInformationResponse-v1130-IEs::=SEQUENCE {
    connEstFailReport-r11 ConnEstFailReport-r11
        OPTIONAL,
    nonCriticalExtension UEInformationResponse-v1250-
        IEs
        OPTIONAL
}
UEInformationResponse-v1250-IEs::=SEQUENCE {
    mobilityHistoryReport-r12 MobilityHistoryReport-r12
        OPTIONAL,
    nonCriticalExtension UEInformationResponse-v1530-
        IEs
        OPTIONAL
}
UEInformationResponse-v1530-IEs: SEQUENCE {
    measResultListIdle-r15 MeasResultList Idle-r15
        OPTIONAL,
    flightPathInfoReport-r15 FlightPathInfoReport-r15
        OPTIONAL,
    nonCriticalExtension UEInformationResponse-v16xy-
        IEs
        OPTIONAL
}
UEInformationResponse-v16xy-IEs::=SEQUENCE {
    mpe-Report-rxx MPE-Report-rxx
        OPTIONAL,
    nonCriticalExtension SEQUENCE { }
        OPTIONAL
}
MPE-Report-rxx::=SEQUENCE {
    mpe-Detected BOOLEAN,
    fr2-MeasResult-rxx SEQUENCE {
        rsrpResult-rxx RSRP-Range,
        rsrqResult-rxx RSRQ-Range
        OPTIONAL
    } OPTIONAL,
    mpe-Duration InSeconds TimeSinceFailure-r11
        OPTIONAL,
    . . .
}
```
--UNNECESSARY PARTS OMITTED
--ASN1STOP 3) MAC CE indicating the MPE event: In this case, the MAC CE would contain the information.

Figure 10:
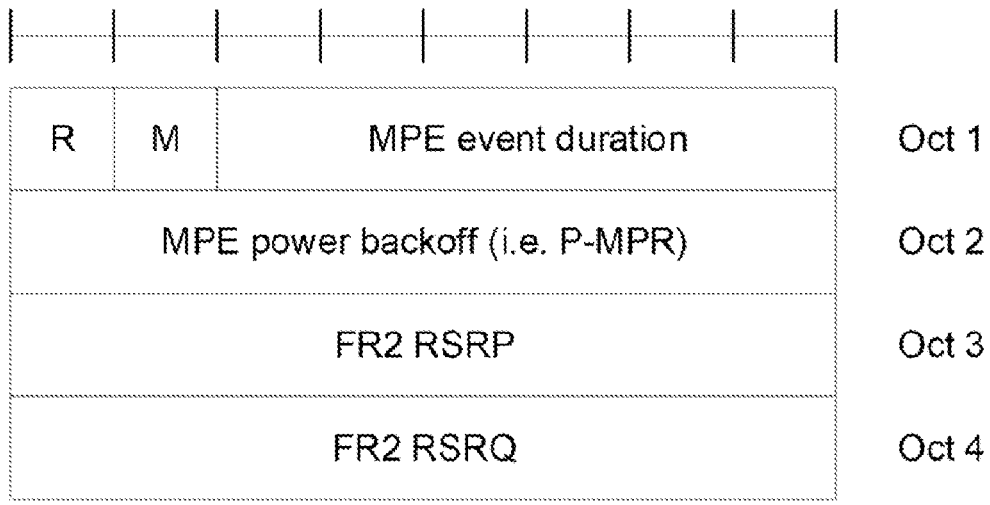
FIG. 10 schematically illustrates an example of a Medium Access Control (MAC) Control Element (CE) suitable for use with examples of the present disclosure.

FIG. 10 schematically illustrates an example of a MAC CE suitable for use with examples of the present disclosure. FIG. 10 shows a MAC CE with:
   an M-bit (i.e. 1 indicating MPE event is ON and 0 that it is OFF),
   current time duration of MPE event,
   P-MPR, and
   measured RSRP/RSRQ from the FR2 carrier/cell.

It is to be appreciated that other ways to the above described detailed examples of signaling, may be provided for transmitting MPE information, i.e. for requesting MPE information and reporting MPE information.

Various, but not necessarily all, examples of the present disclosure can take the form of a method, an apparatus or a computer program. Accordingly, various, but not necessarily all, examples can be implemented in hardware, software or a combination of hardware and software.

Various, but not necessarily all, examples of the present disclosure are described using flowchart illustrations and schematic block diagrams. It will be understood that each block (of the flowchart illustrations and block diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e. such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Various, but not necessarily all, examples of the present disclosure provide both a method and corresponding apparatus comprising various modules, means or circuitry that provide the functionality for performing/applying the actions of the method. The modules, means or circuitry can be implemented as hardware, or can be implemented as software or firmware to be performed by a computer processor. In the case of firmware or software, examples of the present disclosure can be provided as a computer program product including a computer readable storage structure embodying computer program instructions (i.e. the software or firmware) thereon for performing by the computer processor.

Figure 11:
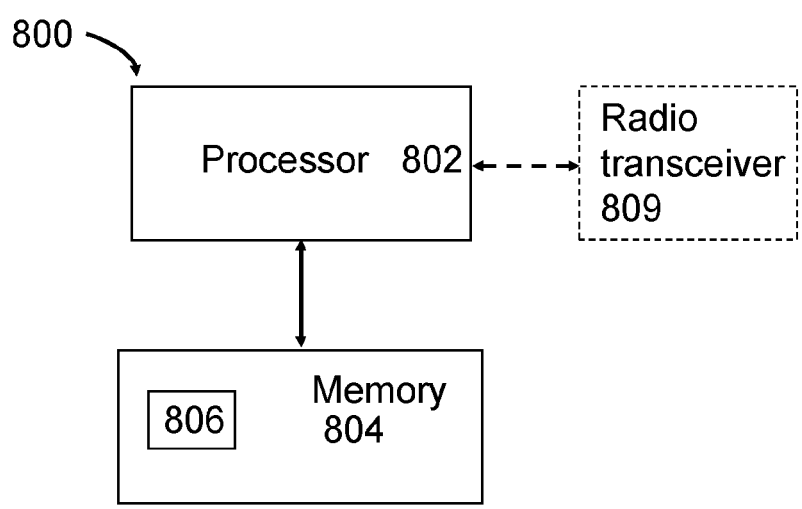
FIG. 11 schematically illustrates an example of an apparatus according to the present disclosure.

FIG. 11 illustrates an example of a controller 800. The controller 800 could be provided within an apparatus, such as a UE 110 or a RAN node 120 that further comprises a radio transceiver 809. The apparatus can be embodied by a computing device, not least such as those mentioned above. In some but not necessarily all examples, the apparatus can be embodied as a chip, chip set or module, i.e. for use in any of the foregoing. Implementation of a controller 800 may be as controller circuitry. The controller 800 may be implemented in hardware alone, have certain aspects in software including firmware alone or can be a combination of hardware and software (including firmware).

As illustrated in FIG. 11 the controller 800 may be implemented using instructions that enable hardware functionality, for example, by using executable instructions of a computer program 806 in a general-purpose or special-purpose processor 802 that may be stored on a computer readable storage medium (disk, memory etc) to be executed by such a processor 802.

The processor 802 is configured to read from and write to the memory 804. The processor 802 may also comprise an output interface via which data and/or commands are output by the processor 802 and an input interface via which data and/or commands are input to the processor 802.

The memory 804 stores a computer program 806 comprising computer program instructions (computer program code) that controls the operation of the apparatus 110, 120 when loaded into the processor 802. The computer program instructions, of the computer program 806, provide the logic and routines that enables the apparatus to perform the methods, processes, procedures and signalling described above and illustrated in FIGS. 5-9. The processor 802 by reading the memory 804 is able to load and execute the computer program 806.

Although the memory 804 is illustrated as a single component/circuitry it may be implemented as one or more separate components/circuitry some or all of which may be integrated/removable and/or may provide permanent/semi-permanent/dynamic/cached storage.

Although the processor 802 is illustrated as a single component/circuitry it may be implemented as one or more separate components/circuitry some or all of which may be integrated/removable. The processor 802 may be a single core or multi-core processor.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

In examples where the apparatus is provided within a UE 110 the apparatus therefore comprises:
  at least one processor 802; and
  at least one memory 804 including computer program code
  the at least one memory 804 and the computer program code configured to, with the
  at least one processor 802, cause the apparatus at least to perform:
    receiving, following a transition of a User Equipment, UE, from operating over at least a first carrier to operating over a second carrier due to a maximum permissible exposure, MPE, event occurring during operation over the first carrier such that the UE is no longer operating over the first carrier, a first signal, over a second carrier, for configuring the UE to determine a status of the MPE event associated with the previously used first carrier;
    determining, responsive to receipt of the first signal, a current status of the MPE event associated with the previously used first carrier; and
    transmitting, responsive to receipt of the first signal, a second signal over the second carrier, wherein the second signal comprises an indication of the current status of the MPE event associated with the previously used first carrier.

In examples where the apparatus is provided within a RAN node 120 the apparatus therefore comprises:
  at least one processor 802; and
  at least one memory 804 including computer program code
  the at least one memory 804 and the computer program code configured to, with the
  at least one processor 802, cause the apparatus at least to perform:
    transmitting, following a transition of a UE from operating over at least a first carrier to operating over a second carrier due to a maximum permissible exposure, MPE, event occurring during operation over the first carrier such that the UE is no longer operating over the first carrier, a first signal, over a second carrier, for configuring the UE to determine a status of the MPE event associated with the previously used first carrier;
    receiving, responsive to transmission of the first signal, a second signal over the second carrier, wherein the second signal comprises an indication of a current status of the MPE event associated with the previously used first carrier.

According to some examples of the present disclosure, there is provided a system comprising the aforementioned UE and RAN node.

Figure 12:
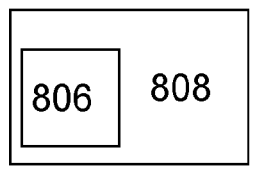
FIG. 12 schematically illustrates an example of a computer program according to the present disclosure.

As illustrated in FIG. 12, the computer program 806 may arrive at the apparatus 110, 120 via any suitable delivery mechanism 810. The delivery mechanism 810 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 806. The delivery mechanism may be a signal configured to reliably transfer the computer program 806. The apparatus 110, 120 may propagate or transmit the computer program 806 as a computer data signal.

In certain examples of the present disclosure, there is provided computer program instructions for causing a UE 110 to perform at least the following or for performing at least the following:

receiving, following a transition of a User Equipment, UE, from operating over at least a first carrier to operating over a second carrier due to a maximum permissible exposure, MPE, event occurring during operation over the first carrier such that the UE is no longer operating over the first carrier, a first signal, over a second carrier, for configuring the UE to determine a status of the MPE event associated with the previously used first carrier;

determining, responsive to receipt of the first signal, a current status of the MPE event associated with the previously used first carrier; and transmitting, responsive to receipt of the first signal, a second signal over the second carrier, wherein the second signal comprises an indication of the current status of the MPE event associated with the previously used first carrier.

In certain examples of the present disclosure, there is provided computer program instructions for causing a RAN node 120 to perform at least the following or for performing at least the following:

transmitting, following a transition of a UE from operating over at least a first carrier to operating over a second carrier due to a maximum permissible exposure, MPE, event occurring during operation over the first carrier such that the UE is no longer operating over the first carrier, a first signal, over a second carrier, for configuring the UE to determine a status of the MPE event associated with the previously used first carrier;

receiving, responsive to transmission of the first signal, a second signal over the second carrier, wherein the second signal comprises an indication of a current status of the MPE event associated with the previously used first carrier.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
- (a) hardware-only circuitry implementations (such as implementations in only analogue and/or digital circuitry) and
- (b) combinations of hardware circuits and software, such as (as applicable):
  - (i) a combination of analogue and/or digital hardware circuit(s) with software/firmware and
  - (ii) any portions of hardware processor(s) with software (including digital signal processor(s)), software, and memory(ies) that work together to cause an apparatus, such as a mobile phone or server, to perform various functions and
- (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The stages illustrated in FIGS. 4 to 9 can represent steps in a method and/or sections of code in the computer program 806. The illustration of a particular order to the blocks does not necessarily imply that there is a required or preferred order for the blocks and the order and arrangement of the block may be varied. Furthermore, it can be possible for some blocks to be omitted.

Where a structural feature has been described, it may be replaced by means for performing one or more of the functions of the structural feature whether that function or those functions are explicitly or implicitly described.

From the foregoing it will be appreciated that in some examples there is provided a system comprising: at least one UE 110 and at least one RAN node 120.

In some but not necessarily all examples, not least such as Enhanced Mobile Broadband (eMBB) use cases, the UE may embodied on a hand held portable electronic device, such as a mobile telephone, wearable computing device or personal digital assistant, that can additionally provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. Moving Picture Experts Group-1 Audio Layer 3 (MP3) or other format and/or (frequency modulation/amplitude modulation) radio broadcast recording/playing), downloading/sending of data functions, image capture function (e.g. using a (e.g. in-built) digital camera), and gaming functions.

The UE may also refer to Internet of Things (IoT) devices, massive industrial networks, smart city infrastructure, wearable devices, networked medical devices, autonomous devices, etc. These types of UE devices may operate for extended periods of time without human intervention (e.g., perform maintenance, replace or recharge an on-device battery, etc.), may have reduced processing power and/or memory storage, may have reduced battery storage capability due to having small form factors, may be integrated into machinery (e.g., heavy machinery, factory machinery, sealed devices, etc.), may be installed/located in hazardous environment or difficult to access environments, etc.

The apparatus can be provided in a module. As used here 'module' refers to a unit or apparatus that excludes certain parts/components that would be added by an end manufacturer or a user.

In some but not necessarily all examples, the UE 110 and the RAN node 120 are configured to communicate data with or without local storage of the data in a memory 804 at the UE 110 or the RAN node 120 and with or without local processing of the data by circuitry or processors at the UE 110, or the RAN node 120. The data may be stored in processed or unprocessed format remotely at one or more devices. The data may be stored in the Cloud. The data may be processed remotely at one or more devices. The data may be partially processed locally and partially processed remotely at one or more devices. The data may be communicated to the remote devices wirelessly via short range radio communications such as Wi-Fi or Bluetooth, for example, or over long-range cellular radio links. The apparatus may comprise a communications interface such as, for example, a radio transceiver for communication of data.

The UE 110, the RAN node 120 can be part of the Internet of Things forming part of a larger, distributed network.

The processing of the data, whether local or remote, can be for the purpose of health monitoring, data aggregation, patient monitoring, vital signs monitoring or other purposes.

As used herein, the term "determining" (and grammatical variants thereof) can include, not least: calculating, computing, processing, deriving, investigating, looking up (e.g., looking up in a table, a database or another data structure), ascertaining and the like. Also, "determining" can include receiving (e.g., receiving information), accessing (e.g., accessing data in a memory), obtaining and the like. Also, "determining" can include resolving, selecting, choosing, establishing, and the like.

In this description, references to "a/an/the" [feature, element, component, means . . . ] are to be interpreted as "at least one" [feature, element, component, means . . . ] unless explicitly stated otherwise.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The description of a function should additionally be considered to also disclose any means suitable for performing that function. Where a structural feature has been described, it can be replaced by means for performing one or more of the functions of the structural feature whether that function or those functions are explicitly or implicitly described.

Although examples have been described in the preceding paragraphs with reference to various examples, it should be appreciated that modifications to the examples given can be made without departing from the scope of the claims.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

Features described in the preceding description may be used in combinations other than the combinations explicitly described above.

Although functions have been described with reference to certain features, those functions may be performable by other features whether described or not. Although features have been described with reference to certain examples, those features may also be present in other examples whether described or not. Accordingly, features described in relation to one example/aspect of the disclosure can include any or all of the features described in relation to another example/aspect of the disclosure, and vice versa, to the extent that they are not mutually inconsistent. Although specific terms are employed herein, they are used in a generic and descriptive sense only and not for purposes of limitation.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some but not necessarily all examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

The examples of the present disclosure and the accompanying claims can be suitably combined in any manner apparent to one of ordinary skill in the art.

Each and every claim is incorporated as further disclosure into the specification and the claims are embodiment(s) of the present invention. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

Whilst endeavouring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. A user equipment (UE), comprising:
   at least one processor; and
   at least one memory storing instructions that, when executed by the at least one processor, causes the UE to perform:
   detecting an initial occurrence of a maximum permissible exposure (MPE) event during operation over a first carrier;
   determining a loss of connection over the first carrier based on the MPE event;
   transmitting, responsive to the detection of the MPE event and the determination of the loss of connection over the first carrier, one or more signals for requesting connection over a second carrier, wherein the one or more signals comprises an indication of the occurrence of the MPE event associated with the previously used first carrier;
   receiving, following the MPE event occurring during operation over the first carrier such that the UE is no longer operating over the first carrier, a first signal, over a second carrier, which configures the UE to determine a status of the MPE event associated with a previously used first carrier;
   determining, responsive to receipt of the first signal, a current status of the MPE event associated with the previously used first carrier by:
   detecting a proximity of a user's body part to an antenna of the UE; and
   measuring one or more characteristics of one or more reference signals received over the first carrier; and
   transmitting, responsive to receipt of the first signal, a second signal over the second carrier, wherein the second signal comprises the following: an indication of the current status of the MPE event associated with the previously used first carrier, an indication that the MPE event is still active over the first carrier, an estimated uplink (UL) transmission power back-off value for MPE compliance over the first carrier; an estimated UL transmission power value to be used over the first carrier; an expected probability of the MPE event re-occurring over the first carrier; one or more signal level parameter values measured over the first carrier; and an amount of time elapsed following a transition from operation over the first carrier to the second carrier.

2. The UE of claim 1, wherein the first carrier uses frequencies above 24 GHz and is monitored for MPE compliance.

3. The UE of claim 2, wherein the second carrier uses frequencies below 6 GHz and is not monitored for MPE compliance.

4. The UE of claim 3, wherein the instructions, when executed by the at least one processor, further cause the UE to perform monitoring, responsive to the first signal, the current status of the MPE event associated with the previously used first carrier while the UE operates over the second carrier and is no longer operating over the first carrier.

5. The UE of claim 4, wherein the first signal comprises a request for MPE information related to the first carrier and the second signal comprises a report of MPE information related to the first carrier.

6. The UE of claim 5, wherein the second signal is transmitted in response to receipt of a new request.

7. The UE of claim 5, wherein the second signal is transmitted upon a determination that there is no longer a user's body part in a propagation path of the first carrier.

8. A system comprising:
   a user equipment (UE);
   at least one processor; and
   at least one memory storing instructions that, when executed by the at least one processor, causes the UE to perform:
   detecting an initial occurrence of a maximum permissible exposure (MPE) event during operation over a first carrier;
   determining a loss of connection over the first carrier based on the MPE event;
   transmitting, responsive to the detection of the MPE event and the determination of the loss of connection over the first carrier, one or more signals for requesting connection over a second carrier, wherein the one or more signals comprises an indication of the occurrence of the MPE event associated with the previously used first carrier;
   receiving, following the MPE event occurring during operation over the first carrier such that the UE is no longer operating over the first carrier, a first signal, over a second carrier, which configures the UE to determine a status of the MPE event associated with a previously used first carrier;
determining, responsive to receipt of the first signal, a current status of the MPE event associated with the previously used first carrier by:
  detecting a proximity of a user's body part to an antenna of the UE; and
  measuring one or more characteristics of one or more reference signals received over the first carrier; and
transmitting, responsive to receipt of the first signal, a second signal over the second carrier, wherein the second signal comprises the following: an indication of the current status of the MPE event associated with the previously used first carrier, an indication that the MPE event is still active over the first carrier, an estimated uplink (UL) transmission power back-off value for MPE compliance over the first carrier; an estimated UL transmission power value to be used over the first carrier; an expected probability of the MPE event re-occurring over the first carrier; one or more signal level parameter values measured over the first carrier; and an amount of time elapsed following a transition from operation over the first carrier to the second carrier.

9. The system of claim 8, wherein the first carrier uses frequencies above 24 GHz and is monitored for MPE compliance.

10. The system of claim 9, wherein the second carrier uses frequencies below 6 GHz and is not monitored for MPE compliance.

11. The system of claim 10, wherein the instructions, when executed by the at least one processor, further cause the UE to perform monitoring, responsive to the first signal, the current status of the MPE event associated with the previously used first carrier while the UE operates over the second carrier and is no longer operating over the first carrier.

12. The system of claim 11, wherein the first signal comprises a request for MPE information related to the first carrier and the second signal comprises a report of MPE information related to the first carrier.

13. The system of claim 12, wherein the second signal is transmitted in response to receipt of a new request.

14. The system of claim 12, wherein the second signal is transmitted upon a determination that there is no longer a user's body part in a propagation path of the first carrier.

15. A method comprising:
  detecting an initial occurrence of a maximum permissible exposure (MPE) event during operation over a first carrier;
  determining a loss of connection over the first carrier based on the MPE event;
  transmitting, responsive to the detection of the MPE event and the determination of the loss of connection over the first carrier, one or more signals for requesting connection over a second carrier, wherein the one or more signals comprises an indication of the occurrence of the MPE event associated with the previously used first carrier;
  receiving, following the MPE event occurring during operation over the first carrier such that user equipment is no longer operating over the first carrier, a first signal, over a second carrier, which configures the UE to determine a status of the MPE event associated with a previously used first carrier;
  determining, responsive to receipt of the first signal, a current status of the MPE event associated with the previously used first carrier by:
    detecting a proximity of a user's body part to an antenna of the UE; and
    measuring one or more characteristics of one or more reference signals received over the first carrier; and
  transmitting, responsive to receipt of the first signal, a second signal over the second carrier, wherein the second signal comprises the following: an indication of the current status of the MPE event associated with the previously used first carrier, an indication that the MPE event is still active over the first carrier, an estimated uplink (UL) transmission power back-off value for MPE compliance over the first carrier; an estimated UL transmission power value to be used over the first carrier; an expected probability of the MPE event re-occurring over the first carrier; one or more signal level parameter values measured over the first carrier; and an amount of time elapsed following a transition from operation over the first carrier to the second carrier.

16. The method of claim 15, wherein the first carrier uses frequencies above 24 GHz and is monitored for MPE compliance.

17. The method of claim 16, wherein the second carrier uses frequencies below 6 GHz and is not monitored for MPE compliance.

18. The method of claim 17, further comprising: monitoring, responsive to the first signal, the current status of the MPE event associated with the previously used first carrier while the UE operates over the second carrier and is no longer operating over the first carrier.

19. The method of claim 18, wherein the first signal comprises a request for MPE information related to the first carrier and the second signal comprises a report of MPE information related to the first carrier.

20. The method of claim 19, wherein the second signal is transmitted upon a determination that there is no longer a user's body part in a propagation path of the first carrier.

* * * * *